(12) United States Patent
Karanam et al.

(10) Patent No.: US 6,266,713 B1
(45) Date of Patent: Jul. 24, 2001

(54) FIELD UPGRADEABLE DYNAMIC DATA EXCHANGER SERVER

(75) Inventors: Rajaiah Karanam, Plainville; Radoslaw Narel, New Britain; James Petrizzi, Tariffville, all of CT (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/405,560

(22) Filed: Sep. 24, 1999

Related U.S. Application Data

(63) Continuation-in-part of application No. 08/628,533, filed on Apr. 3, 1996, now abandoned.

(51) Int. Cl.$^7$ .............................. G06F 3/00; G06F 13/10; G06F 9/00
(52) U.S. Cl. .............................. 710/9; 709/301; 709/302; 713/1; 713/100
(58) Field of Search ................................. 713/205, 102; 713/1, 2, 100; 709/300–305

(56) References Cited

U.S. PATENT DOCUMENTS

| | | | |
|---|---|---|---|
| 5,613,151 | * | 3/1997 | Dockser .............................. 711/202 |
| 5,887,190 | * | 3/1999 | Priem et al. .............................. 710/3 |

* cited by examiner

*Primary Examiner*—Sumati Lefkowitz
(74) *Attorney, Agent, or Firm*—Cantor Colburn LLP; Carl B. Horton

(57) ABSTRACT

A dynamic data exchange (DDE) server (100) which allows external programs to access power management data is presented. The DDE server (100) provides a mnemonic cross reference between register items and standardized, alphanumeric parameter names. This mnemonic interface allows the user to retrieve data from a device without knowledge of the actual device register item number. The DDE server (100) is optimized for either the Modbus RTU or Ethernet protocol. The DDE server (100) acts as a link between a client requesting device data and a field device which can provide the data. The DDE server (100) communicates to the field device through communication ports and to the client via DDE or NetDDE message link. A client sends its requests to server to read/write some device registers. The server maps each request to suitable device read/write request packets and carries out the necessary transaction with device. Then it relays the result back to the client after processing and casting the collected device data to proper format. To configure the DDE server (100), the user can export and import files containing register groups and mnemonics in comma separated value format. By importing and exporting register groups and mnemonics, the user can change the firmware revision register map or mnemonics of a device class supported by the DDE server (100), change the number or types of registers or mnemonics, or add a new generic device type.

20 Claims, 22 Drawing Sheets

Register Mapping Scheme

AMP_A=> Current of phase A for a meter identified by DDE topic, Register address R30020

VOL_A=> Voltage of phase A for a meter identified by DDE topic, Register address R30100

R30400=> An item addressed directly with register address. No conversion required.

Register Mapping Scheme

AMP_A => Current of phase A for a meter identified by DDE topic, Register address R30020

VOL_A => Voltage of phase A for a meter identified by DDE topic, Register address R30100

R30400 => An item addressed directly with register address. No conversion required.

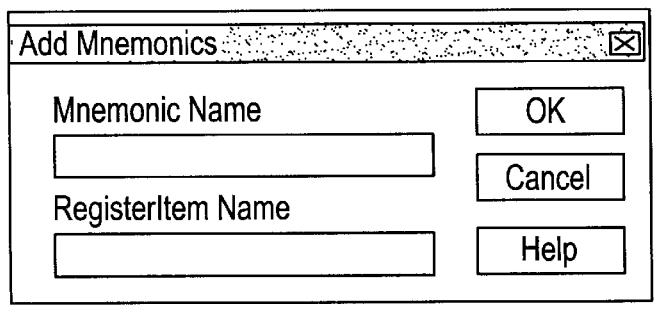
FIG. 21
```
COMMCARD_FW_REV    R40000
REPORT_PKT_SIZE    R40001
MODEL_NUMBER       R40002S16
PROM_VERSION       R40010S12
SERIAL_NUMBER      R40016S16
OP_BKR_1           R00500
OP_BKR_2           R00501
ENABLE_OUTPUT      R00502
TRIGGER_OSC        R00503
CANCEL_REPORT      R00504
CHANNEL_TEST       R00505
```
FIG. 22
FIG. 23
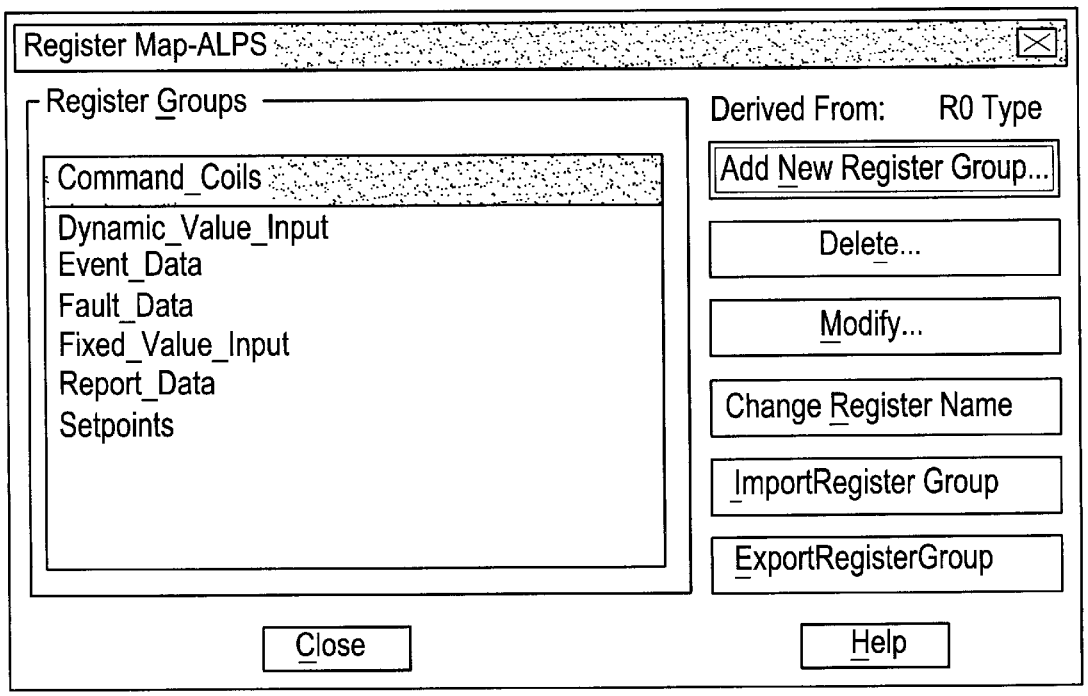

FIG. 27
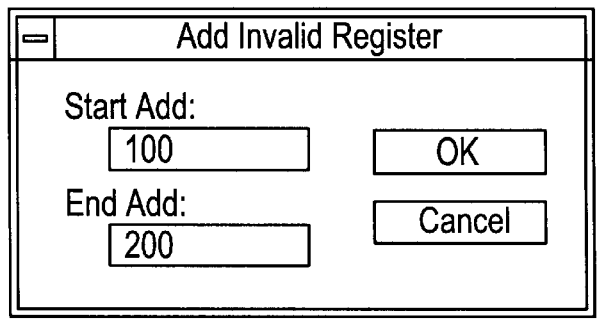
FIG. 28
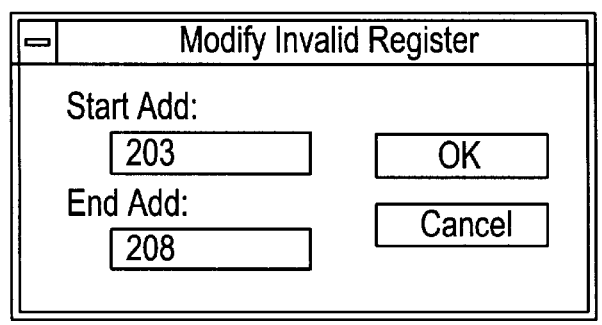
FIG. 29
| | | | | | | |
|---|---|---|---|---|---|---|
| + | Fixed_Value_Input | R4 | 0X0000 | 0X0019 | WO | PollOnce |
| + | Dynamic_Value_Input | R3 | 0X03E8 | 0X047C | | FastPoll |
| - | | | 0X043A | 0X046A | | |
| + | Fault_Data | R3 | 0X05DD | 0X06D8 | | FastPoll |
| + | Setpoints | R4 | 0X0BB8 | 0X1131 | WO | SlowPoll |
| - | | | 0X0BBC | 0X0BD1 | | |
| - | | | 0X0C00 | 0X0C06 | | |
| + | Command_Coils | R0 | 0X01F4 | 0X01F9 | WO | PollOnce |
| + | Event_Data | R3 | 0X07D1 | 0X0B54 | | FastPoll |
| + | Report_Data | R3 | 0X4E20 | 0X4E7F | | PollOnce |

FIELD UPGRADEABLE DYNAMIC DATA EXCHANGER SERVER

This is a continuation-in-part of U.S. patent application Ser. No. 08/628,533, filed Apr. 3, 1996, which is incorporated by reference herein.

BACKGROUND OF THE INVENTION

The invention relates generally to a Dynamic Data Exchange Server for use in a power management control system and in particular, to a field upgradeable Dynamic Data Exchange Server.

In today's power management control systems, a variety of power monitoring or control devices are connected to a common bus, which allows the power monitoring or control devices to communicate with a server. One standard protocol used for communicating between the server and the power control and monitoring devices is the Modbus RTU standard. Another protocol, Dynamic Data Exchange (DDE), allows independently developed programs to share data and instructions with each other. Using these protocols, the system server can allow external programs to access power management data. There are many Modbus RTU/DDE servers (DDE servers) commercially available for a wide variety of applications. All major electrical distribution companies have a similar product. The narrow scope of these servers is their major limitation. These systems expect the client applications (Human-Machine Interfaces) to handle the complexities of the actual power controlling and metering devices. Many of the servers are designed to communicate using a protocol designed for use with only certain devices, family of devices or specially designed devices. Also, not all the servers are able to support any generic Modbus RTU compliant device.

An improved DDE server is described in U.S. Pat. No. 5,764,155 entitled "Dynamic Data Exchange Server" (the '155 patent). The DDE server described therein provides a mnemonic cross-reference between register items and standardized, alphanumeric parameter names. This mnemonic interface allows the user to retrieve data from a device without knowledge of the actual device register item number. The DDE server acts as a link between a client requesting device data and a field device, which can provide the data. The DDE server communicates to the field device through communication ports and to the client via a DDE or NetDDE message link (Net DDE is an extension of DDE allowing programs running on different computers to share data). A client sends its requests to server to read/write some device registers. The server maps each request to suitable device read/write request packets and carries out the necessary transaction with device. Then it relays the result back to the client after processing and casting the collected device data to proper format.

The DDE server described in the '155 patent is a drastic improvement over those previously known in the art. However, the DDE server of the '155 patent and the DDE servers of the prior art are programmed to serve a particular release of end device firmware. Thus, when end device firmware is upgraded, a new release of DDE server software may be required. Additionally, in order to support a new, generic device type, the register map and mnemonics would have to be manually entered into the DDE server software. The programming required for upgrading the firmware or configuring a new, generic device type results in both time and money costs. In addition, a modification to the DDE server software increases the danger of introducing new software bugs.

BRIEF SUMMARY OF THE INVENTION

A field upgradeable DDE server can be configured without modifying the DDE server software. In an exemplary embodiment of the invention, the DDE server is configured by importing a file containing register group data for a group of registers in a plurality of power monitoring or control devices. The register group data includes addresses for the group of registers and a group name. A register map for the group of registers is created using the addresses, and the register map is associated with the group name.

In an alternate embodiment, the DDE server is configured by importing a file including a mnemonic and an address for a register in a power monitoring or control device. A register map for the register is created using the address and the mnemonic is associated with the register map.

BRIEF DESCRIPTION OF THE DRAWINGS

Referring now to the drawings wherein like elements are numbered alike in the several FIGURES:

FIG. 21 is a view of an add/modify mnemonics dialog box generated by the computer software of FIG. 3;

FIG. 22 is a printout sample of a mnemonic file in character separated value format for import to or export from the mnemonics window of FIG. 20;

FIG. 23 is a view of a register map window with import and export features generated by the computer software of FIG. 3;

FIG. 27 is a view of a add invalid register window generated by the computer software of FIG. 3;

FIG. 28 is a view of a modify invalid register window generated by the computer software of FIG. 3;

FIG. 29 is a printout sample of a register group file in character separated value format for import to or export from the register map window of FIG. 22;

DETAILED DESCRIPTION OF THE INVENTION

Figure 1:
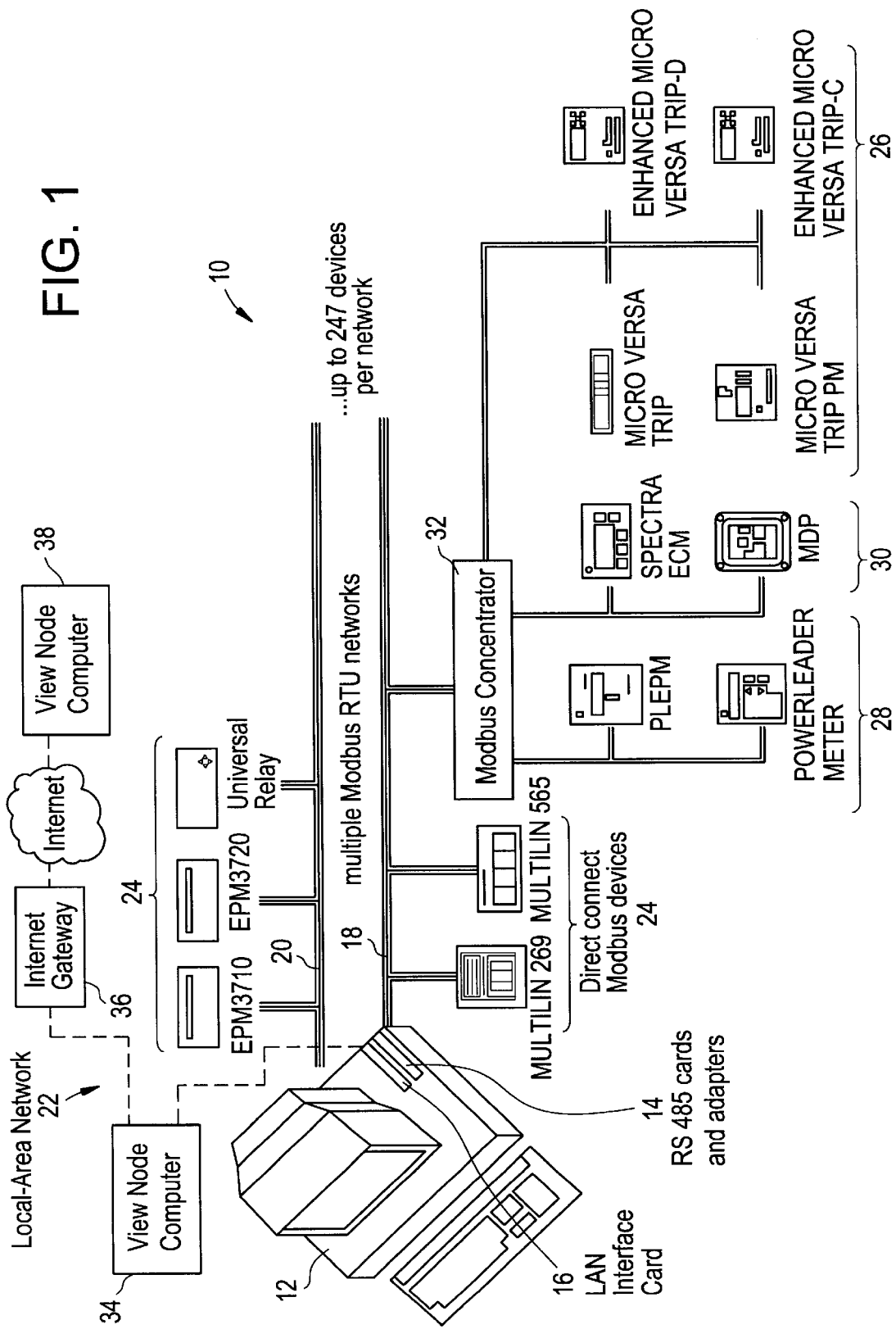
FIG. 1 is a block diagram of a power management and control system in accordance with a Modbus embodiment of the present invention.

Referring to FIG. 1, a network diagram for a power management control system (PMCS), generally shown at 10, in accordance with aforementioned U.S. patent application Ser. No. 08/628,533, which is incorporated by reference. System 10 comprises a host computer 12, e.g., an IBM-PC AT compatible machine which is based on a Pentium processor, having standard RS485 interface cards 14, or an RS232 to RS485 converter, and adapters installed in its I/O slots, see, EIA-485, Standard for Electrical Characteristics of Generators and Receivers for Use in Balanced Digital Multipoint Systems. Host computer 12 further comprises a local area network (LAN) interface card 16, such as an Ethernet card, in another of its I/O slots. The host computer 12 contains software for monitoring and controlling selected aspects of power usage/consumption, as described in more detail hereinafter. Cards 14 provide I/O ports, which define multiple industry standard Modbus RTU networks 18 and 20, see, e.g., "Modicon Modbus Protocol-Reference Guide" Rev. E., Modicon, Inc. In this example, up to eight Modbus RTU networks can be provided from host computer 12. The Modbus RTU protocol is a well-known industry standard. Card 16 provides an I/O port which allow host computer 12 to communicate with a LAN 22.

Devices with a Modbus RTU interface can be connected directly to the Modbus, e.g., control devices 24, such as, Multilin models 269 and 565, power management EPM 3710 and EPM 3720, and General Electric Co.'s Universal Relay family of modular relay devices. Other devices communicate on the Commnet protocol and include trip units 26, e.g., Trip, Enhanced Trip-D, Trip PM and Enhanced Trip-C Units, which are commercially available from General Electric Co., meters 28, e.g., Power Leader Meters commercially available from General Electric Co., and relays 30, e.g., General Electric Co.'s Spectra ECM and Power Leader MDP, are also employed as described above with regard to the prior art. A Modbus concentrator 32 provides an interface between the Modbus RTU protocol and the Commnet protocol, whereby these devices can communicate through Modbus concentrator 32 over the Modbus (again, an industry standard protocol). In this example, up to thirty-two devices (i.e., direct connect devices or Modbus concentrators) can be connected to each Modbus RTU network.

LAN 22 includes view node computer 34 and Internet gateway 36. View node computer 34 interacts with PMCS network 10 through NetDDE links to host computer 12 established on LAN 22. Similarly, a remote view node computer 38 can interact with PMCS network 10 through NetDDE links to host computer 12 established via the Internet, Internet gateway 36, and LAN 22.

Figure 2:
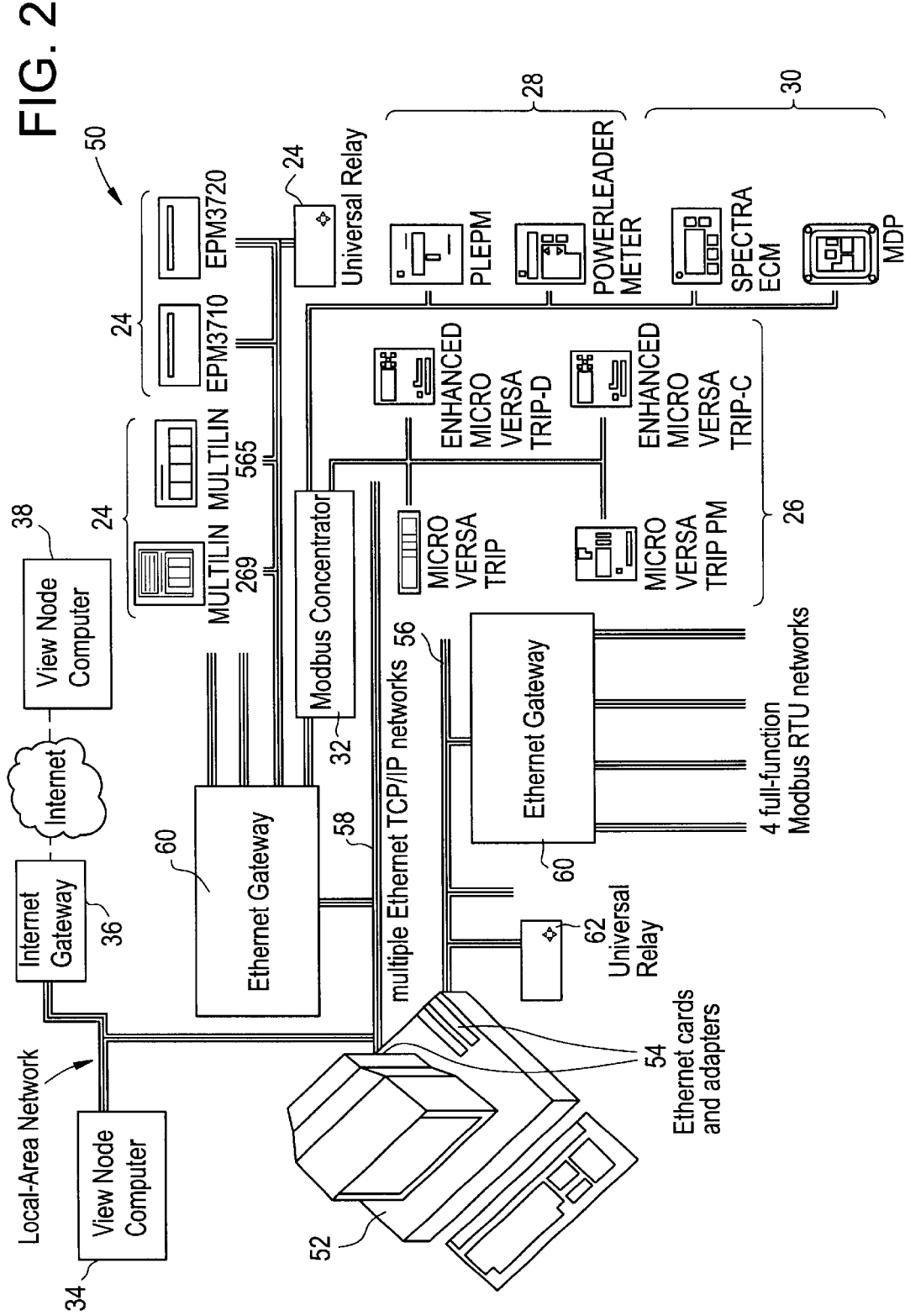
FIG. 2 is a block diagram of a power management and control system in accordance with an Ethernet embodiment of the present invention.

Referring to FIG. 2, a network diagram for a second embodiment of the power management control system, generally shown at 50, in accordance with aforementioned U.S. patent application Ser. No. 08/628,533. System 50 comprises a computer 52, e.g., a PC based computer, having standard Ethernet interface cards 54 and adapters installed in its I/O slots. The computer 52 contains software for monitoring and controlling selected aspects of power usage/consumption, as described in more detail hereinafter. The Ethernet TCP/IP protocol is a well-known standard, which would allow a user of the power management control system of the present invention to use its existing LAN. The use of an existing LAN may significantly reduce installation cost of the system, since much of the system wiring may already be in place. Ethernet gateways 60 are connected to the Ethernet TCP/IP networks 56 and 58 to provide an interface between the Ethernet TCP/IP protocol and the Modbus RTU protocol. In the present example, each Ethernet gateway 60 provides a connection between an Ethernet TCP/IP network 56 and 58 and four Modbus RTU networks. Connections to any one of the Modbus RTU networks are the same as described with respect to the embodiment of FIG. 1. More specifically, devices with a Modbus RTU interface can be connected directly to the Modbus, e.g., control devices 24, such as, Multilin models 269 and 565, and General Electric Co.'s Universal Relay family of modular relay devices. Trip units 26, e.g., Trip, Enhanced Trip-D, Trip PM and Enhanced Trip-C Units, which are commercially available from General Electric Co., meters 28, e.g., Power Leader Meters commercially available from General Electric Co., and relays 30, e.g., General Electric Co.'s Spectra ECM and Power Leader MDP, are also employed as described above with regard to the prior art. Modbus concentrator 32 provides an interface between the Modbus RTU protocol and the Commnet protocol, whereby these devices can communicate through Modbus concentrator 32 over the Ethernet. Device 62 with Ethernet TCP/IP interface can be connected directly to the Ethernet TCP/IP network 56 or 58, e.g., General Electric Co.'s Universal Relay family of modular relay devices.

Ethernet TCP/IP networks 56 and 58 can also include view node computer 34 and Internet gateway 36. In the present example, view node computer 34 interacts with host computer 52 through NetDDE links established via Ethernet TCP/IP network 58. Similarly, a remote view node computer 38 can interact with host computer 52 through NetDDE links established via via the Internet, Internet gateway 36, and Ethernet TCP/IP network 58.

Figure 3:
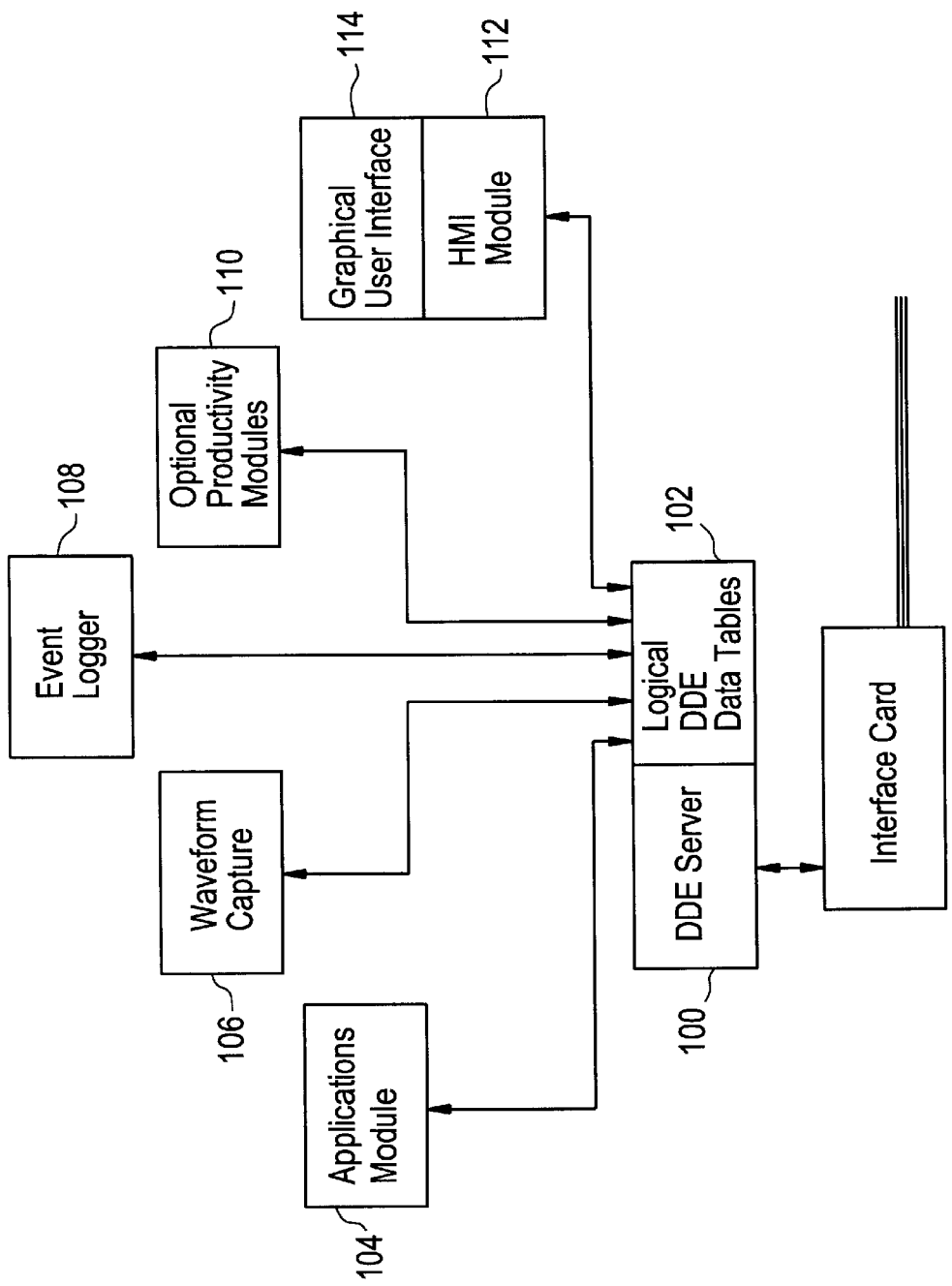
FIG. 3 is a block diagram of the computer software used in the power management and control system of the present invention.

Referring now to FIG. 3, a block diagram of the software for monitoring and controlling selected aspects of power usage/consumption, discussed above is generally shown. This software is loaded into the computer as described above and includes a dynamic data exchange (DDE) server 100. DDE server 100 allows external programs (clients) running on the host and view node computers to access power management data in a Microsoft Windows environment. Data interface to DDE server 100 is provided by the system through a Human-Machine Interface (HMI) utility. The DDE server is a 16 bit application under Windows NT. A configuration and control interface for the DDE server is provided through server application window menus. Associated with DDE 100 are logical data tables 102 and related modules, i.e., an Excel or other DDE aware applications module 104, a waveform capture module 106, an event logger module 108, productivity modules 110, and a HMI module 112. Module 112 includes a tool kit for building screens and interfaces, and a graphical user interface 114 for monitoring and control of the electrical distribution system. The graphical user interface 114 for the server operates in 32 bit Windows or Windows NT environment and HMI library functions. Module 106 provides for viewing and analysis of waveforms (e.g., Fourier, frequency and/or harmonic analysis) captured by sophisticated metering devices. Module 108 provides for viewing, organizing and analyzing unusual behavior in a power system. Productivity modules 110 include, for example, a cost allocation module and a load management module. The cost allocation module provides for tracking power consumption to the sub-unit level, developing internal billing methods and reports, thereby reducing cost. The load management module provides for tracking power demand and automatically shedding non-critical loads to prevent peak demand penalties, and provides for timer-based control to reduce power consumption. DDE server 100 communicates though the interface card, i.e., the RS485 interface cards 14, or a RS232 to RS485 converter, in the embodiment of FIG. 1 and the Ethernet interface cards 54 in the embodiment of FIG. 2.

DDE server 100 is described herein for the RS485 interface embodiment. However, it will be appreciated that the same is applicable to the Ethernet interface embodiment with the exception that the server is optimized for Ethernet protocol (instead of Modbus RTU protocol). DDE server 100 provides a mnemonic cross-reference between Modbus RTU register items and standardized, alphanumeric parameter names. This mnemonic interface allows the user to retrieve data from a device without knowledge of the actual device register item number. DDE server 100 further provides a consistent device event data item for dissimilar devices. Also, DDE server 100 automatically performs time synchronizing for all supported devices and provides a consistent waveform interface. DDE server 100, for the RS485 interface, is optimized for Modbus RTU protocol by compensating for invalid ranges of registers in the device polling packets and it also provides superior protocol debugging capabilities by displaying the complete Modbus RTU input/output packet traffic. In addition, the DDE server 100 performs automatic conversion between 16 bit and 32 bit device register modes. A generic interface allows any Modbus RTU device to be used with the system. The DDE server uses the Modbus RTU protocol standard for communication to metering, relaying and I/O devices using the RS-485 communication ports.

Every windows application is registered in a windows kernel with an application name. To uniquely identify a data item for communication between two cooperating (process aware) windows applications, the data item is identified by tuple (Application, Topic, Item). Topic name provides a grouping and item name specifies the actual data point to be accessed under a topic. For the DDE server, the application name is the server's executable name. Topic name can be the device identification name and item name can be the register identification of a field data point. For example, with a General Electric Co. EPM meter, the tuple can be GE16MODB, EPM1, AMP.sub.-- A where GE16MODB is the Application name for a DDE Server, EPM1 is the meter identification name, and AMP.sub.-- A is the current for phase A. DDE messages mainly include requests to send data as identified by the Topic and Item name. They may also be for set point download to the data point as identified by the Topic and Item names. Input parameter values are reported by field devices on the communication interface in response to a poll by the server. This value may be a float value, an integer value, a string or discrete status bits.

The DDE server includes toolkit functions that are used to maintain DDE or NetDDE communications. Registers can be classified into Fast Poll Registers, Slow Poll Registers and Poll Once Registers. Fast Poll Registers are polled at a rate defined by 'Scan Interval' which is entered during device/topic configuration. Slow Poll Registers are polled once in every 'n' fetches of Fast Poll Registers and the value of 'n' is read from an initialization file. 'Poll Once' registers are polled only once when an item in that group becomes active. 'Poll Once' registers are also polled when a device status changes from DEAD to ACTIVE. Set points registers are to be downloaded based on request from a DDE client, i.e., a program, for example, such as an HMI package or MS-Excel, which request data items from the DDE server and accepts data through DDE or NetDDE.

Figure 4:
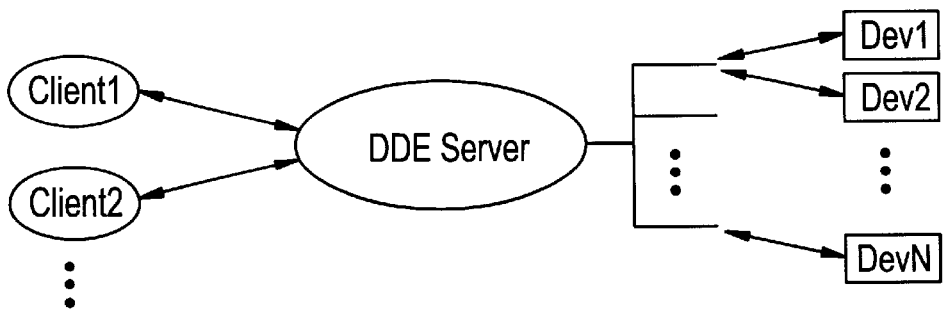
FIG. 4 is a schematic block diagram the DDE server link between clients and devices of the power management and control system of the present invention.

Referring to FIG. 4, the DDE server acts as a link between a client requesting device data and a field device that can provide the data. The DDE server communicates to the field device through communication ports and to the client via a DDE or NetDDE message link. A client sends its requests to the server to read/write some device registers. The server maps each request to suitable device read/write request packets and carries out the necessary transaction with the device. Then it relays the result back to the client after processing and, if necessary, casts the collected device data to the proper format. Apart from reporting contents of normal device registers, the server can also collect special data like waveform capture/recording data from the device and pass it to a client.

Figure 5:
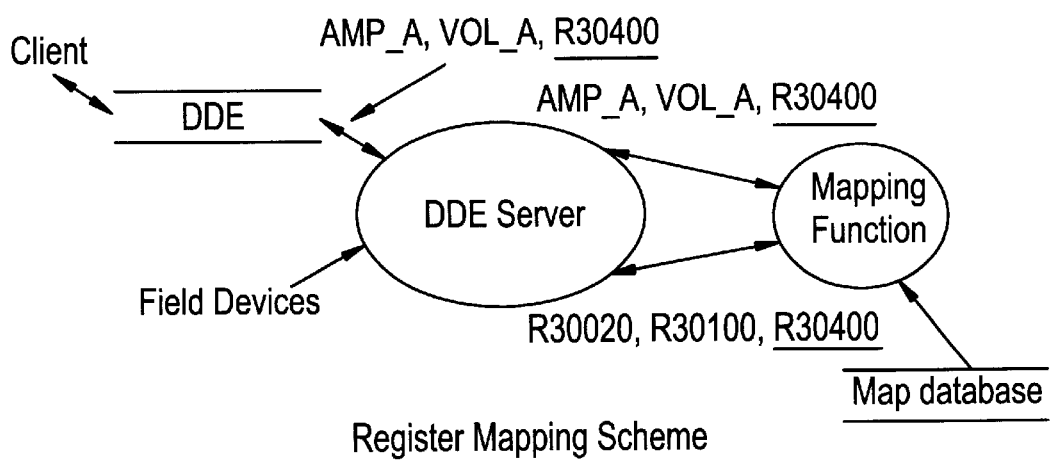
FIG. 5 is a schematic block diagram of the DDE server register mapping scheme of the power management and control system of the present invention.

To ease the configuration of field data points the user can access field data points on the DDE or NetDDE link using mnemonics which easily identify data points rather than using register addresses. At the same time, the register based item names are provided to maintain compatibility with Modbus RTU protocol conventions. Referring to FIG. 5, the DDE server maps item names to their register addresses. The name mapping database and functions are implemented in such a manner that underlying server does not get affected when new naming conventions for item are to be implemented. Preferably an off-line utility builds a device mnemonic to register address map. The device mnemonic to register map can then be imported during off-line mode, as described hereinafter. The DDE server supports the following data types; signed integer, unsigned integer, signed long, modulus 10000, floating points numbers in IEEE format, discrete bits, and an array of any of the above data types.

The DDE server interfaces through the RS485 interface, e.g., a multiport (4 port or 8 port) RS485 Stargate communication card or through a RS232/RS485 converter. The RTS line may have to be activated/deactivated to ensure proper flow control. Hardware flow control for all the ports is enabled/disabled when the communication port is configured. In the present example, the DDE server supports a maximum of 8 communication ports, whereby a maximum of 247 Modbus RTU devices can be connected on each port and the Modbus concentrators cannot have an address greater than 32. Addresses of devices connected to any one port should be unique. DDE server 100 can interface to client nodes on a network using NetDDE support for DDE communication.

The DDE server supports following data types: unsigned integer, a default for Rnnnrn item name; signed integer, specified is 'I' with an Item name of RnnnnnI; long signed integer, specified is 'L' with an Item name of RnnnnnL; floating point value, specified is 'F' with an Item name of RnnnnnF; discrete status bits, specified is 'D' with an Item name of RnnnnnDxxxxx; modulus 10000, specified as 'E' with an Item name of RnnnnnE; and array values, an array of either signed integer, unsigned integer, long signed integer and float values with array specified 'Axxx'.

Figure 6:
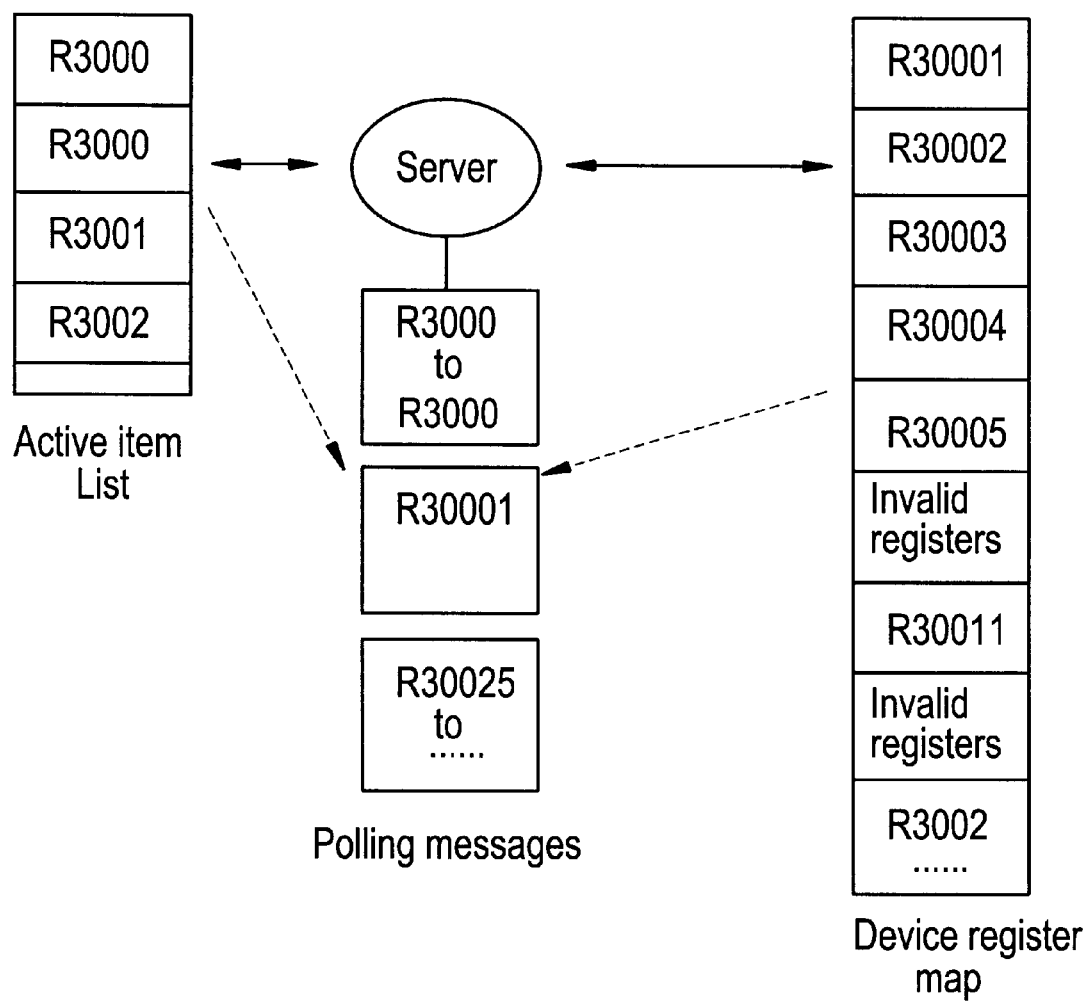
FIG. 6 is a schematic block diagram of the DDE server, register map and message polling of the power management and control system of the present invention.

Referring to FIG. 6, the DDE server handles field device communication through timer call back functions. The DDE server polls the devices which are in an active list and from each device it acquires registers (items) which are in the active list. The DDE server may group various items while performing data acquisition to optimize polling required from field devices. Device register maps usually have some gaps for future use. While grouping various items in a single polling cycle, the DDE server accounts for invalid register addresses for a particular device. Fast and Slow Group Registers are not packed into the same packet. The DDE server may have to limit grouping because of limitations on packet length of the response packet or the download packet. The maximum packet length is restricted to 125 registers (250 bytes) by Modbus RTU protocol standards. The DDE server executes set point commands received from client applications and communicates all set point values to the devices. The DDE server periodically synchronizes time with connected devices and adjusts for the time formats of each of these devices.

The Modbus concentrator accepts time register write requests for all devices connected to it but does not change the time register value of any device in response to write requests. The time registers for all the devices connected to a Modbus concentrator will be changed only when the server synchronizes time with the concentrator. Periodical time download to selected devices are performed even if it may not have any effect on that particular device. Time synchronization for other devices are performed as per the register format specified for the device register maps.

The DDE server maintains current status (DEAD/ACTIVE) of all active topics (devices). This information does not have any direct register associated with the device topic name and hence a pseudo item called 'STATUS' is maintained by the DDE server. If the DDE server does not get a response from any device during 'n' consecutive poll cycles then that particular device is declared DEAD. The value of 'n' is read from an initialization file. The status of any device will be updated to a client only if a predefined item called 'STATUS' is made active. DEAD devices would be polled with period equal to a dead device scan interval (available in initialization file) instead of the device scan interval. DEAD devices will become ACTIVE when they respond to a polling request.

The DDE server displays communication traffic in text format in its Window, if it is setup to do so. A setup option is provided in the server main menu for this purpose. Communication traffic is displayed in a 'scrollable' window for selected devices and selected options.

Further, the DDE server logs communication errors which include, by way of example, time-out errors, CRC errors, wrong station ID responses, exception responses and extra bytes reported in the response to a query from the device. The DDE server logs communication errors for ACTIVE devices only and logs the device status whenever a device becomes ACTIVE or DEAD.

Server configuration data is accepted through the interfaces and is stored in initialization files or other configuration files. Configuration is an off-line function and is disabled during run-time. The configuration utility is provided for: communication port configuration, device/topic configuration, device type register map configuration, device type register group polling priority configuration, device type supported function codes configuration, device type register map invalid register addresses, item mnemonic to register mapping, and server operational parameters. The configuration utility also allows the export and import of register groups and mnemonics.

In the present example, up to 8 communication ports can be configured. It will be appreciated, that this is restricted by the number of ports that the 16 bit Windows or Windows NT communication driver will support. For each port the following parameters can be configured:

Baud Rate: 1200, 2400, 4800, 9600, 14400, 19200, 38400, 57600

Parity: Even, Odd, None

Stop Bits: 1, 2

Hardware flow control: Enable, Disable

Presently, Modbus RTU protocol standards require eight bits. At the time of initialization, the DDE server configures the communication ports, devices and timers as defined by user. Also, all device specific databases are initialized. From the main menu the user can start the server, stop the server, suspend protocol, and resume protocol during runtime.

Configuration ranges in the present example are as follows; a device name can be up to 20 characters, a scan interval can be in the range of 1–9999999 milliseconds, and a slave address can be in the range of 1–247. It will be appreciated, that multiple topics can be configured with the same slave address and communication port. The configuration utility will detect multiple topics before configured on the same slave address and will issue a warning message to this effect when user configures a topic on an already configured address. The communication port to which a device is connected must be previously defined.

A device type register map must be configured for each of the device topics connected thereto. The system provides for configuration of a starting valid address, a last valid address, a set of invalid register blocks using this utility. Valid registers, in the present example, are R0XXXX; R1XXXX; R3XXXX; or R4XXXX. Accordingly, DDE server 100 supports the following Modbus register types; R0XXXX--Discrete coils, R1XXXX--Discrete status registers, R3XXXX--Input registers, and R4XXXX--Set point registers. With these generic types, a user can configure any number of register types. Each of these types will have poll rate attributes (i.e., Fast Poll, Slow Poll, or Poll Once). Buffered events, read/write date/time registers for time synchronization, waveform capture data and waveform recording data are implemented differently in the devices which support them hence, no common configuration utility is provided for these functions. The DDE server handles each of these functions specifically. Again a mnemonic name is associated with a register address. Further, a user can configure protocol timer tick and valid data time out value with this utility. Server time out tick is read from an initialization file.

By way of example, several of the devices discussed above, i.e., EPM, RMS6, RMS9B, RMS9C, RMS9D, ECM, MDP and the Modbus concentrator, include register types R3XXXX; R4XXXX; and R0XXXX. To acquire data from these devices and to download set points, the DDE server implements Modbus function codes, 01, 03, 04, 05, 06, 16, 56. Various register groups, i.e., dynamic values, set points, command registers, event registers, fixed value registers, and Commnet statistics can be configured by the user into either Slow Poll Register or Fast Poll Registers or Poll Once Registers. The DDE server downloads time stamps to all these devices periodically. Time download periodicity is available in an initialization file. An event count register is polled at the Fast Poll rate. When the event count register is nonzero, an event fetch is performed by reading the start address from the event buffer. Each event is read and time stamped sequentially. The event code is expanded with a description, additional data fields, and a date stamp of the events before sending to client.

In general, the DDE server provides appropriate return values as specified for all clients, i.e., periodic polling packets for active topics and items, periodic polling packets for events and status, periodic update of time to all the devices, data value update to clients for acquired items, event/status report to the HMI package so that it becomes part of normal alarm log, and status update for active topics (devices). Set point write requests are properly formatted set point download communication packets for the request. Execution and termination of the server are initiated on user request from the DDE server window menu.

The following Modbus function codes are supported by the DDE server of the present invention:

Function Code 1: Read Coils,
Function Code 2: Read Input status,
Function Code 3: Read holding registers,
Function Code 4: Read input registers,
Function Code 5: Write single coil,
Function Code 6: Write single holding register,
Function Code 15: Write multiple coils,
Function Code 16: Write multiple holding registers, and
Function Code 56: Retransmit last response.

Figure 7:
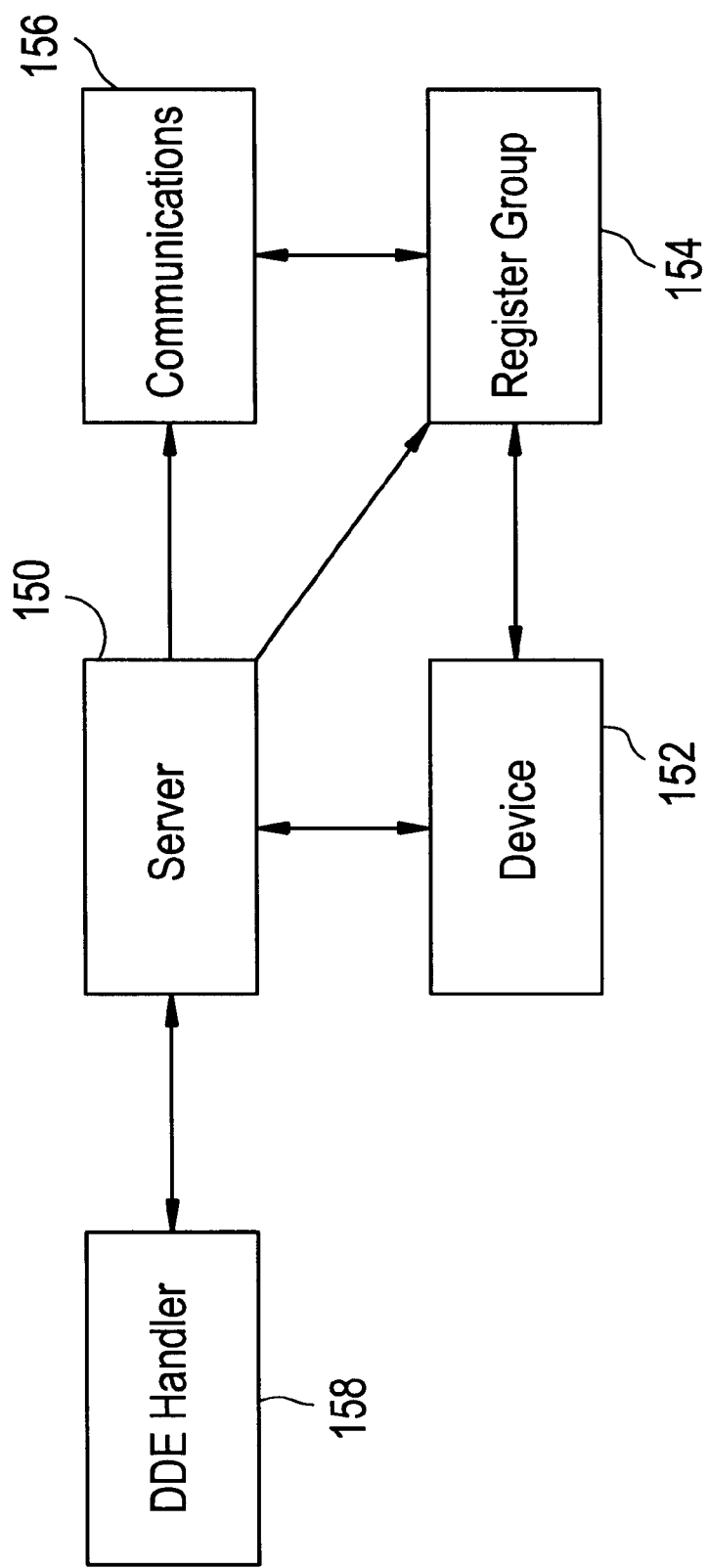
FIG. 7 is a schematic block diagram of the component subsystems of the DDE server, including a server module, a DDE handler module, a device module, a register group module and a communications module.

Referring to FIG. 7, the component subsystems (i.e., modules) of the DDE server include; the server (application) 150, the device module 152; the register groups module 154; the communication module 156; and the DDE handler module 158. All these modules (except for the DDE handler) employ an object oriented approach. Each module comprises several classes.

The application module 150 handles all external inputs to the system viz., user interactions and client requests via the DDE or NetDDE link. As described above the server is configured for various devices when server is off-line. The configuration parameters include register map configuration, mnemonic configuration, and configuration of the communication port to which the device is attached. While on-line, the server will expect requests from clients through the DDE handler and service those requests. It also receives any special command from user, e.g., to stop the protocol, and carries it out properly. In the application module, Class, CServer, provides server communication with the toolkit through the DDE handler and synchronizes comport processing.

Figure 8:
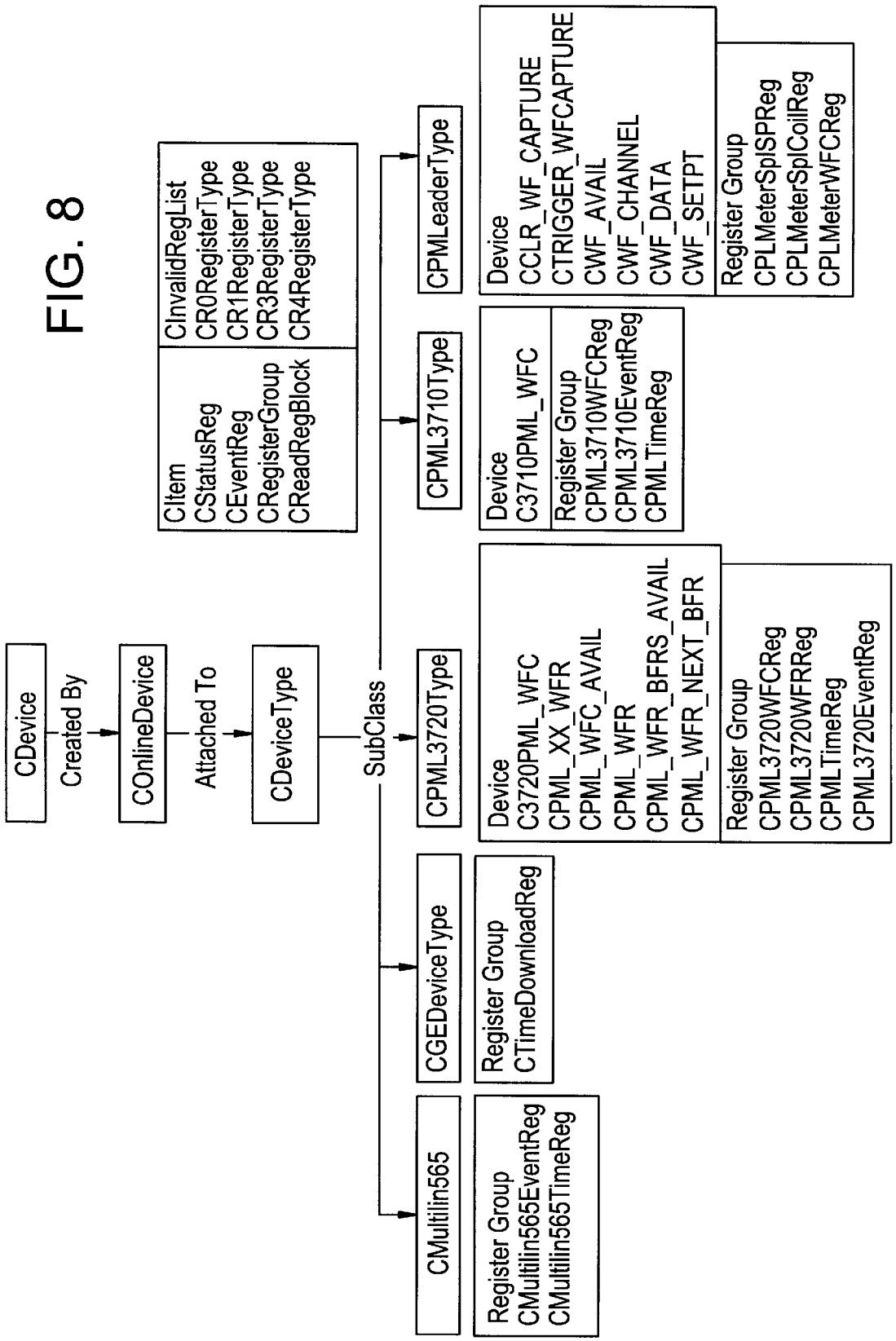
FIGS. 8 and 9 are diagrams of the device module of FIG. 7.
Figure 9:
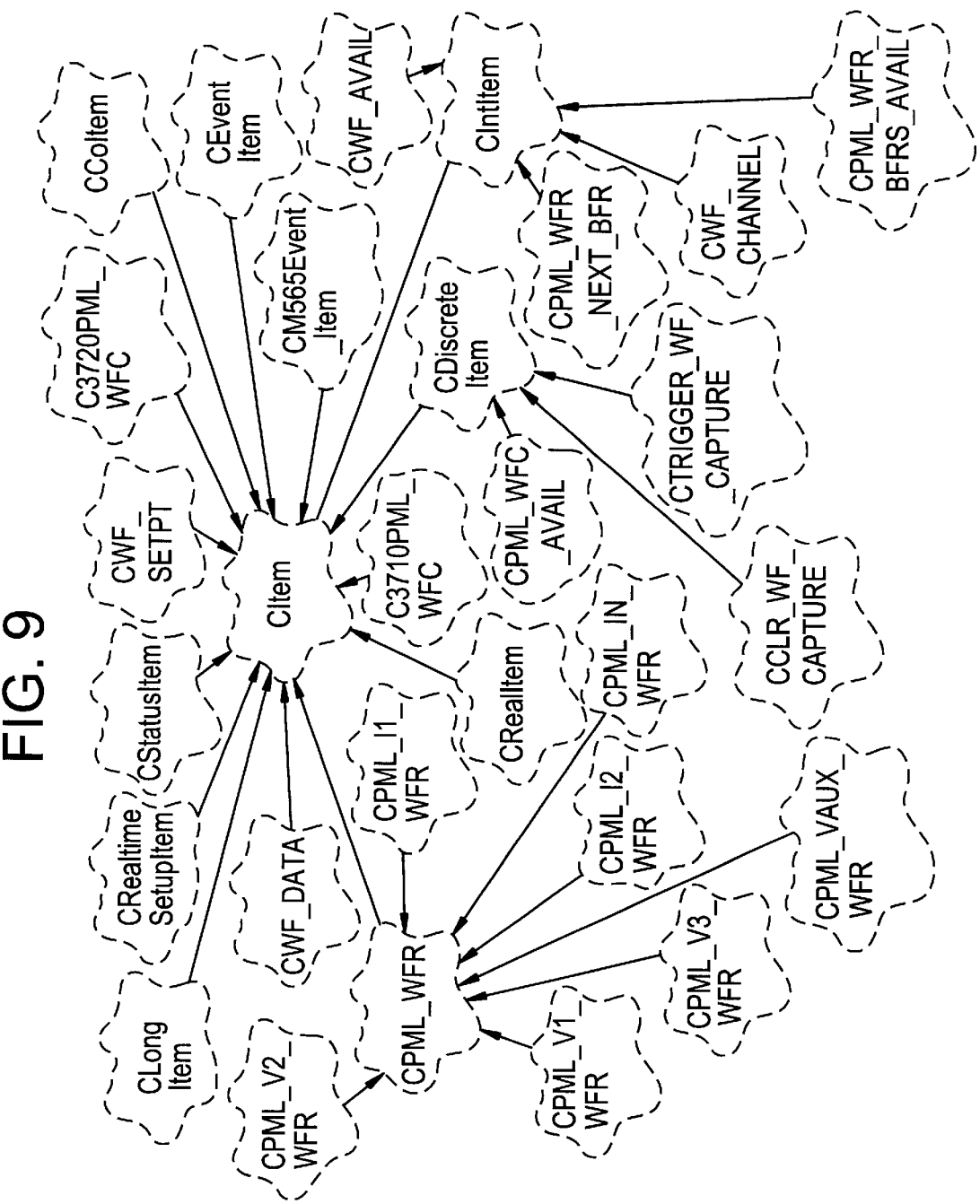

Referring to FIGS. 8 and 9, the device module 152 abstracts a field device and handles multiple register categories (or register groups). Class, CCoilItem, provides support for the special discrete register bit operations for R0 and R1 reference register types. Class, CDev, contains all device information like device name, device ID, device type name and com-port 15 address. Class, CDeviceType, abstracts a field device type the server will talk to, has a variable number of register groups, contains a mnemonics list, and has function codes associated with it. Class, CDiscreteItem, extracts discrete bit array in a register, for a 16-bit register, all 16 bits can be programmed while for a 32-bit register only the lower 16 bits can be specified by user. Class, CEventItem, handles the event processing for a selected device, e.g., a General Electric Co. device, formats an event string and passes it to the client. Class, CGEDeviceType, supports event register group, by way of example, part nos.

EPM, RMS6, RMS9B, RMS9C, RMS9D, ECM, PLMeter and MDP qualify as General Electric Co. device types. Class, CIntItem, takes care of unsigned and signed integer items. Class, CItem, is a data point present in field device. CItem comprises a plurality of registers in the device and can handle a single type or array of types. CItem is the base class for different types of items present in the application and include integer, long, real, coil, discrete bits and real time parameters. An item has reference to the register group it belongs to. Whenever a new item is created or activated a dummy register block is created and polled immediately for the fast updating of the item. Class, CLongItem, handles a signed long data type. Class, CMnemonic, contains the mnemonic name and the corresponding register format. Class, CModbusConcType, automatically synchronizes time with all Modbus concentrator device which have only time download property. Class, CMultilin565EventItem, handles the special event processing present for Multilin 565 device. Class, CMultilin565Type, supports event register group and processing for Multilin meters, which are similar to that of General Electric Co. devices. Class, COnLineDevice, exist only when the server is running, whenever an on-line device is created, a copy of its device type is created and attached to the on-line device. Class, CPLMeterType, is associated with the General Electric Co. Power Leader meter devices and supports CPLMeterWFCReg register group for waveform capture. Class, CPLMeterWFDataItem, is a text item associated with the PLMeter. CPLMeterWFDataItem is a collection of 'n' samples read from the device, with the number of samples and sample's start address are read from the application's .INI file. Class, CPML3710EventItem, handles the event processing for a PML3710 Device and formats an event string and passes it to the client. Class, CPML3710Type, supports a PML3710 Device where the default register group CPML3710WFCRegGroup supports waveform capture. The event processing is similar to other device types except that it doesn't contain an event count register. Class, CPML3710WFCDataItem, is a text item associated with the PML3710. CPML3710WFCDataItem is a collection of n samples read from the device. Each sample is 12 bits and two consecutive registers, giving three values. The number of samples and sample's start address are read from the application's .INI file. Normally for PML devices the WFC is 99 registers. Class, CPML3720AvailItem, handles the PML.sub.-- WFC.sub.-- AVAIL special item in the PML3720 device. Class, CPML3720EventItem, handles the event processing for a PML3720 Device and formats an event string and passes it to the client. Class, CPML3720Type, supports a PML3720 device. The default register groups that go with this device type are CPML3720WFCRegGroup and CPML3720WFRRegGroup for handling waveform capture and waveform recording respectively. Class, CPML3720WFCDataItem, is a text item associated with the PML3720. CPML3720WFCDataItem is a collection of 'n' samples read from the device, where each sample is 12 bits and two consecutive registers, giving three values. The number of samples and sample's start address are read from the application's .INI file. Class, CPML3720WFRDataItem, collects required sample data and updates them to the client. CPML3720WFRDataItem handles the PML.sub.-- WFR.sub.-- BFRS.sub.-- AVAIL and PML.sub.-- WFR.sub.-- NEXT.sub.-- BFR special is items in the PML3720 device. Class, CRealItem, keeps data in an IEEE floating point format, in 16-bit mode, two registers are required while in 32-bit mode, only one register will give the value. Class, CStatusItem, is a text item which exists in every device. The status strings that are updated by this item to a device are ACTIVE and DEAD.

Figure 10:
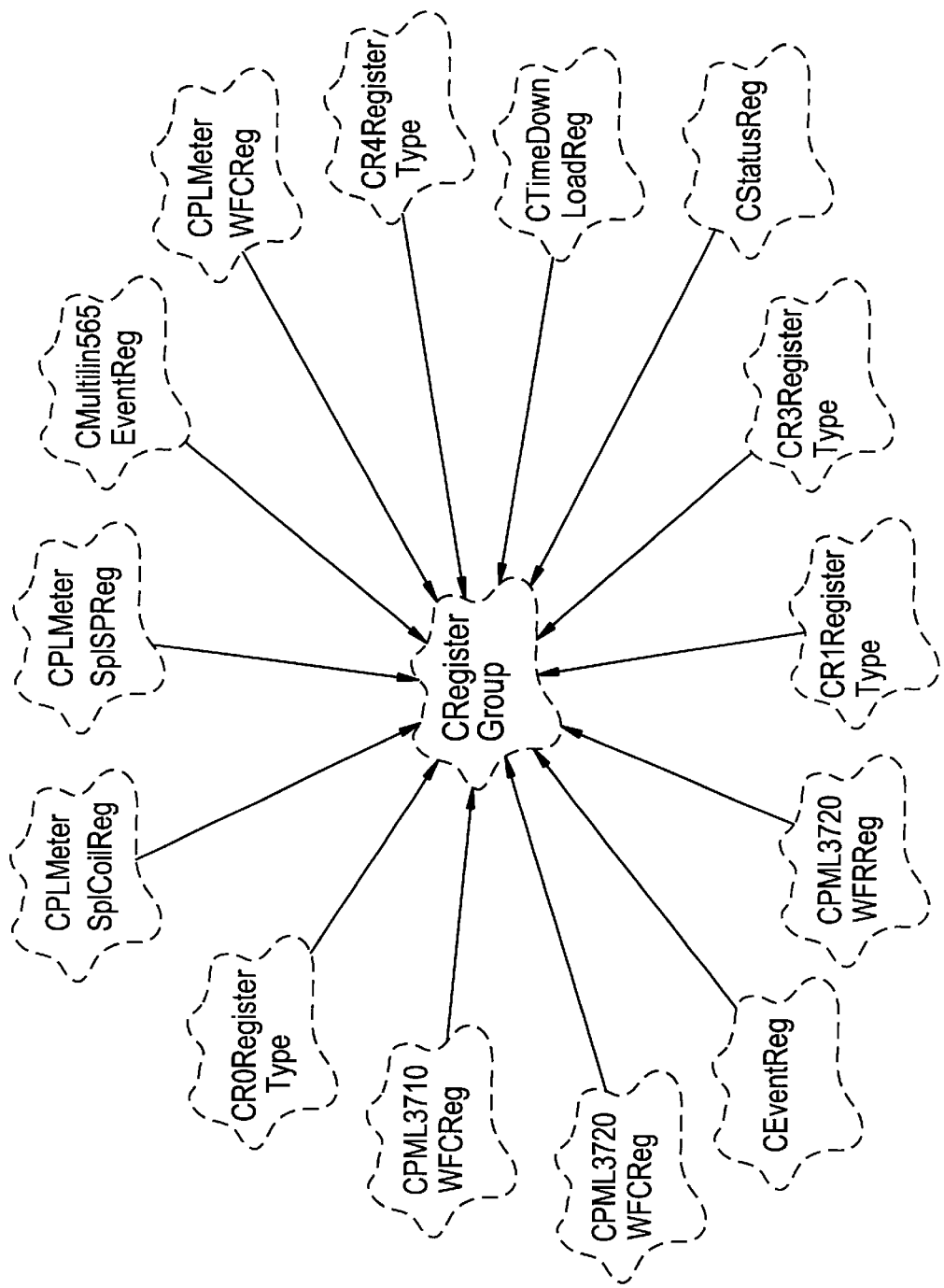
FIG. 10 is a diagram of the register group module of FIG. 7.

Referring to FIG. 10, the register group module 154 supports an array of registers, a few registers in the array may be declared as invalid. Consecutive registers can be grouped together to define an item or a point. An item performs processing on these registers depending on the item type. Clients are interested in the item value after the processing has taken place. The register group module is designed to handle multiple numbers of such items. Class, CEventReg, supports events handling for General Electric Co. devices. Class, CInvalidRegBlock, maintains the invalid range where it contains invalid registers range in (Start, End) pairs. Class, CInvalidRegList, list is an ObList containing CInvalidRegBlock objects for a particular register group. Class, CMultilin565EventReg, supports the Multilin565 events. Class, CPLMeterSplCoilReg, manages two command coil items, i.e., TRIGGER.sub.-- WF.sub.-- CAPTURE and CLR.sub.-- WF.sub.-- CAPTURE for General Electric Co. Power Leader Meter. Class, CPLMeterSplSPReg, manages set point registers for the Power Leader Meter. A DDE item present in this group is WF.sub.-- SETPT. Class, CPLMeterWFCReg, supports waveform capture for General Electric Co. Power Leader Meter. DDE items present in this group are WF.sub.-- DATA, WF.sub.-- AVAIL, WF.sub.-- CHANNEL, WF.sub.-- HOUR, WF.sub.-- MIN, WF.sub.-- SEC, and WF.sub.-- MSEC. This register group supports waveform capture data retrieve. Class, CPML3710EventReg, supports the PML3710 events. Class, PML3710WFCReg, is a register group for PML3710 and has a DDE item referred to as PML.sub.-- WFC. This register group supports the PML.sub.-- WFC item in retrieving the WFC data from the device. Class, CPML3720EventReg, handles the PML 3720 events. Class, CPML3720WFCReg, is a register group for PML3720 and has only two DDE items which are referred to as PML.sub.-- WFC and PML.sub.-WFC.sub.-- AVAIL. This register group supports the PML.sub.-- WFC item in retrieving the WFC data from the device depending on the availability of the data (which is known by PML.sub.-- WFC.sub.-- AVAIL). Class, CPML3720WFRReg, is a register group for PML3720 device and has several DDE items which are referred to as PML.sub.-- WFR, PML.sub.-- WFR.sub.-- BFRS.sub.-- AVAIL, PML.sub.-- WFR.sub.-- NEXT.sub.-- BFR, PML.sub.-V1.sub.-- WFR, PML.sub.-- V2.sub.-- WFR, PML.sub.-- V3.sub.-- WFR, PML.sub.-- VAUX.sub.-- WFR, PML.sub.-- 11.sub.-- WFR, PML.sub.- 12.sub.-- WFR, PML.sub.-- 13.sub.-- WFR and PML.sub.-- IN.sub.-- WFR. Class, CR0RegisterType, supports function codes 01 (coil read), 05 (write single coil), 15 (write multiple coils). This is a generic register group type from which the user is allowed to dynamically instant many register groups for a device type. Class, CR1RegisterType, supports function code of 02 (for read discrete bits). All write commands on this type of registers are discarded. This is a generic register group type from which the user is allowed to dynamically instant many register groups for a device type. Class, CR3RegisterType, has a 04 (read input registers) function code. All write commands on this type of registers are discarded. This is a generic register group type from which the user is allowed to dynamically instant many register groups for a device type. Class, CR4RegisterType, is a register group that has specific function codes that are 03 (read holding registers), 06 (write single register), and 16 (write multiple registers). This is a generic register group type from which the user is allowed to dynamically instantiate many register groups for a device type. Class, CReadRegBlock, contains a valid register range which can be used while sending read packet to the device. A valid block may represent one or more than one item. It also contains start and stop positions of items in the register group's item list for register group's convenience while updating the item values to toolkit. The valid blocks are recalculated whenever an item is added or deleted, hence the register blocks list is dynamically changing. Class, CRegister Group, handles a category of registers whose access will be similar by client. It has list of all active items of the group in a member called m-ItemList. Also it has a list of valid register blocks. It can acquire data for all active items in m-ItemList and download data for an item to the device. It maintains a list of valid blocks, which is sent to the field device one at a time. A valid block is polled on behalf of maximum possible items thus optimizing the polling. Class, CStatusReg, manages the STATUS item. This register group and the item are present for all the devices. Class, CTimeDownloadReg, downloads time to the Modbus concentrator and General Electric Co. devices and does not support any items. Class, CTimeDownload565, downloads time to the Multilin565 device and does not support any items. Class, CTimeDownloadPML, downloads time to the PML3710 and PML3720 devices, and does not support any items.

Figure 11:
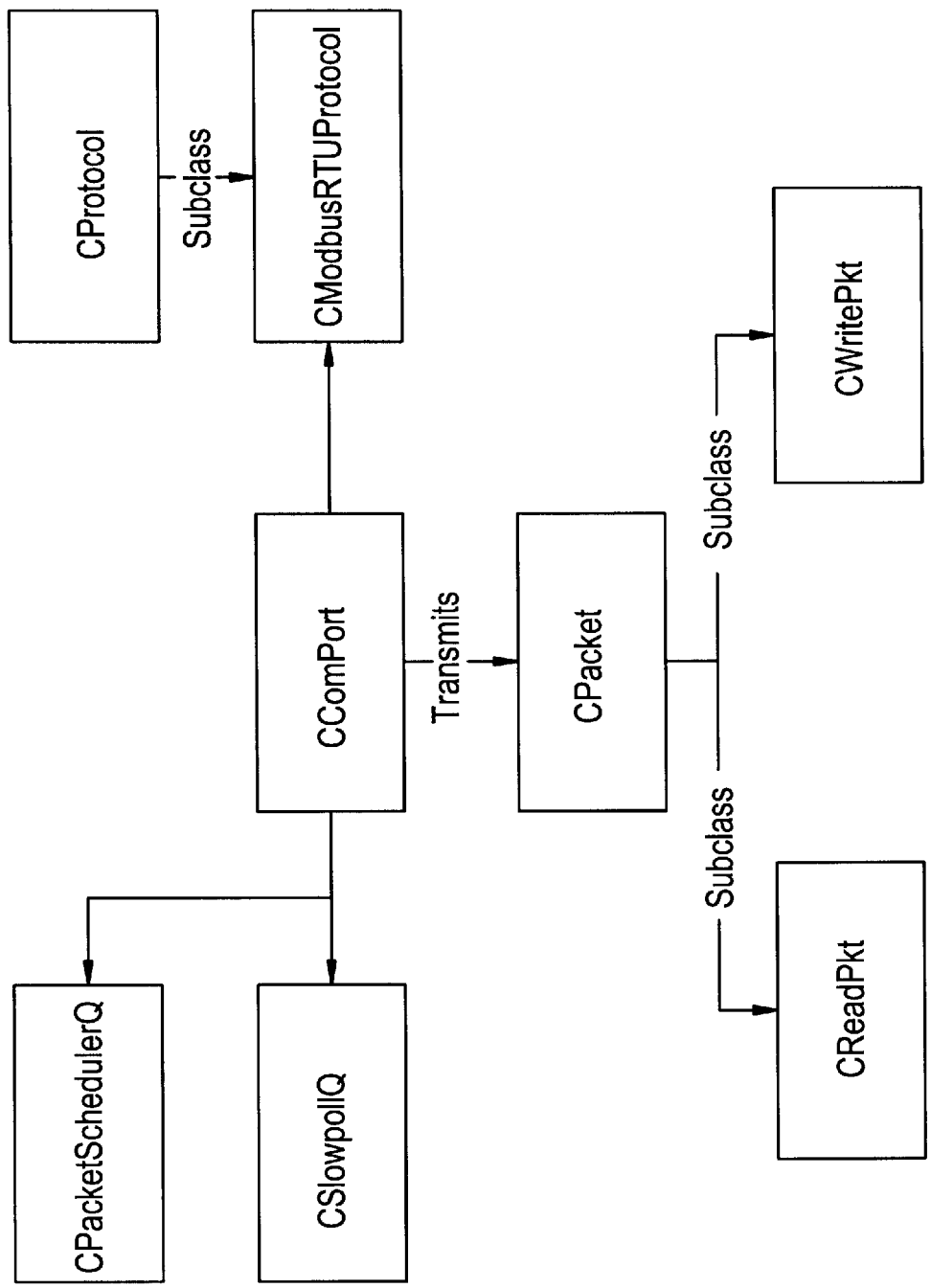
FIGS. 11 and 12 are diagrams of the communication module of FIG. 7.
Figure 12:
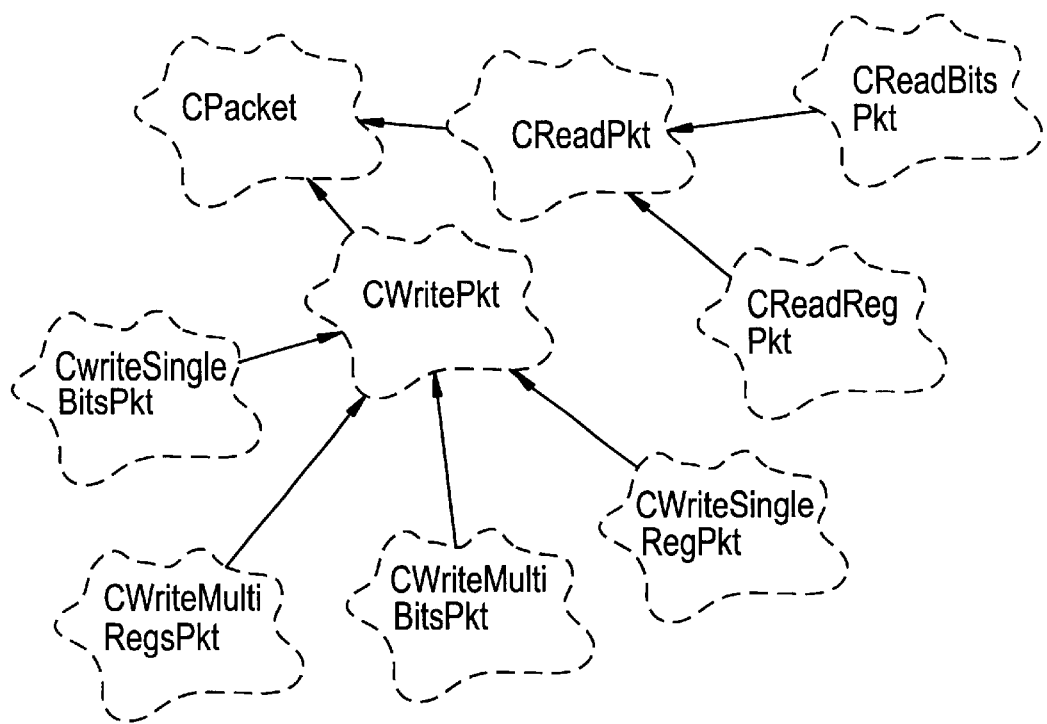

Referring to FIGS. 11 and 12, the communication module 156 enables the server to communicate with a device. All client requests are to be mapped to various Modbus packets and then these packets have to be transmitted to the device successfully. Also the replies from the devices are received here first and checked for CRC error. This module also is capable of declaring any device as DEAD if it cannot communicate with the device or ACTIVE when communication resumes with a previously DEAD device. Class, CComPort, supports the transaction of a Modbus packet between the server application and the device. The corn port maintains a queue of packets and returns immediately after transmitting a packet and checks for the response only at the next scan cycle. This improves throughput of packet I/O with the device. Class, CModbusRTUProtocol, implements the specific Modbus RTU protocol functions. This improves class implements Modbus RTU protocol and the method of adding CRC to the data bytes before sending to device. Also, it checks CRC for response bytes and clears it for further processing. Class, CPacket, implements the common understanding between the server and the device with which both are able to talk to each other. The packet does not contain CRC. The CPacket contains both the request as well as the response and acts as a base class for Modbus function code implementation. The packet's interface with items is fixed as two bytes per register in 16-bit mode and four bytes per register in 32-bit mode. For a discrete item or a coil item, the rightmost bit only is used, while all other bits are discarded. Class, CProtocol, is a generalized protocol base class. A protocol is a set of rules governing the format and meaning of the messages (or packets) that are exchanged between the server and the device. CProtocol is designed such that it can put any error-check on bytes before transmitting and also do any error checks on response bytes that are received. Class, CReadBitsPkt, reads discrete registers (R1 reference) and coil register (R0 reference). Class, CReadPkt, is a base packet class that provides generalized methods for all those Modbus packets that are meant for reading register values. Class, CReadRegPkt, reads input registers (R3 reference) and holding registers (R4 reference). Class, CWriteMultiBitsPkt, writes into multiple coil registers (R0 reference). Class, CWriteMultiRegsPkt, writes into multiple holding registers (R4 reference). Class, CWritePkt, is a base packet class which provides generalized methods for all those Modbus packets which are meant for writing single or multiple register values. Class, CWriteSingleBitsPkt, writes into single coil registers (R1 reference). Class, CWriteSingleRegPkt, writes into single holding registers (R4 reference).

The DDE handler module 158 implements the toolkit interface functionality for communicating to clients. It handles various DDE communications with clients and uses HMI package support to interface server class with the HMI toolkit and supports the DDE or NetDDE message protocol. The DDE server utilizes the DDE handler to implement DDE or NetDDE communication links with clients. All client requests are suitably broken down to one or more of the following operations by DDE Handler: CreateTopic, the server becomes ready to poll the device indicated by topic name; CreateItem, an item can be created only for an already created topic and the server becomes ready for polling the item; ActivateItem, the server starts polling the field device corresponding to topic whose item has been activated and supplies the item value to requesting client periodically; DeactivateItem, polling of the active item is stopped; DeleteItem, the specified item is no more required and hence is deleted; and ExecuteCommand, the client performs a command on the device with the specified topic name, whereby if the device is present, and is able to understand the command, the command processing is carried out by server.

Figure 13:
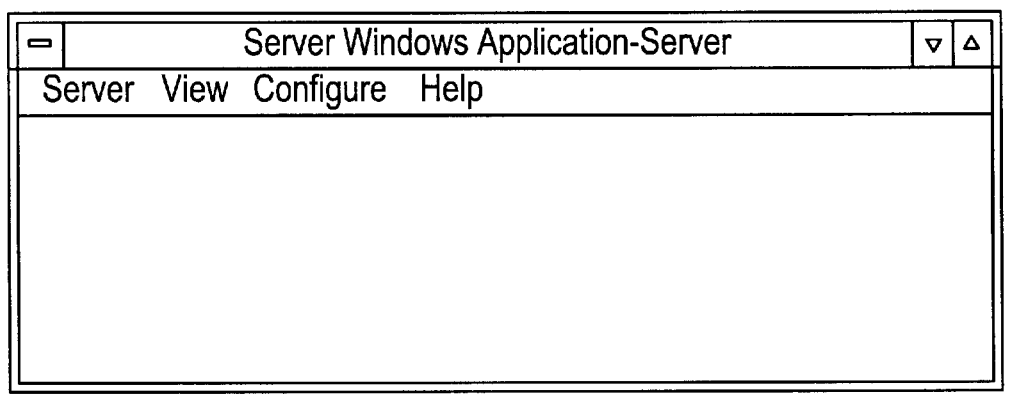
FIGS. 13 and 14 are views of a server windows application window generated by the computer software of FIG. 3.
Figure 14:
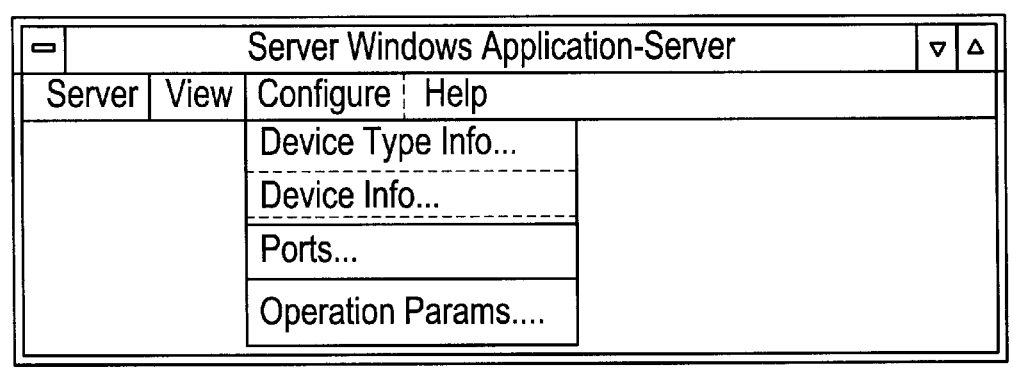
Figure 15:
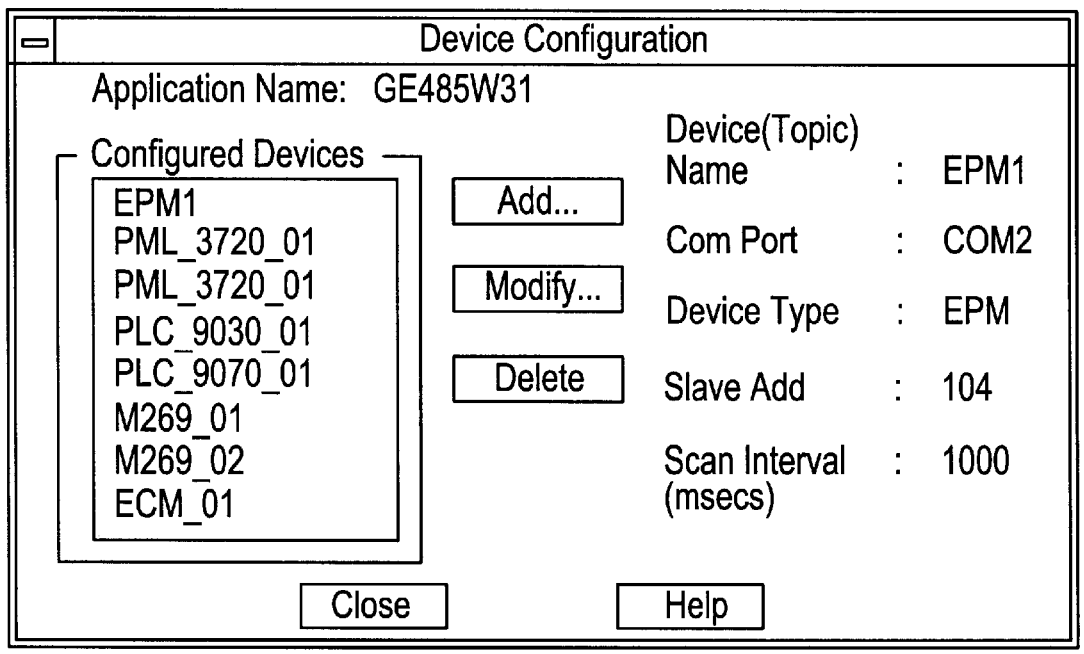
FIG. 15 is a view of a device configuration window generated by the computer software of FIG. 3.
Figure 16:
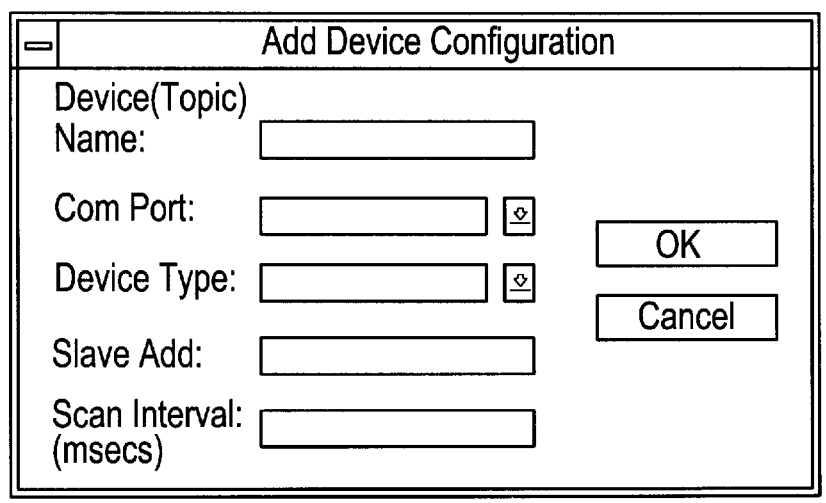
FIG. 16 is a view of an add device configuration window generated by the computer software of FIG. 3.
Figure 17:
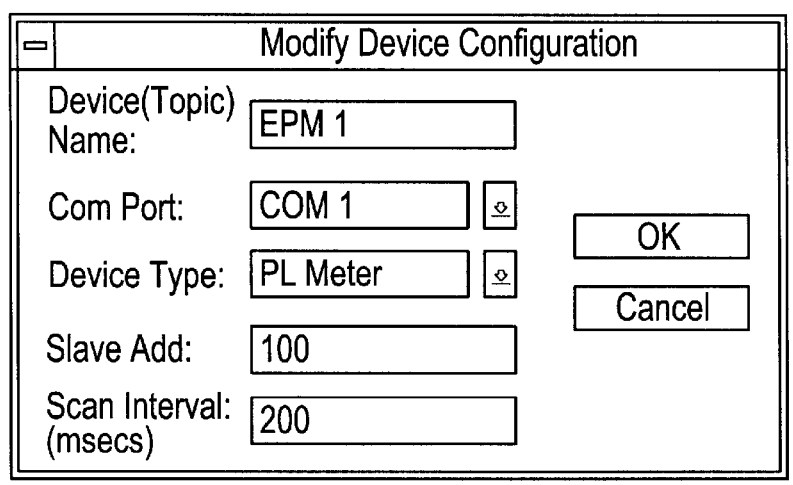
FIG. 17 is a view of a modify device configuration window generated by the computer software of FIG. 3.

The DDE SERVER WINDOWS APPLICATION--SERVER screen, off-line mode, is generally shown in FIG. 13. The CONFIGURATION button is selected on the SERVER WINDOWS APPLICATION--SERVER screen generating a menu from which DEVICE INFO is selected as shown in FIG. 14. Selection of DEVICE INFO generates a DEVICE CONFIGURATION screen shown in FIG. 15. From the DEVICE CONFIGURATION screen, configuration of a new device (ADD), modification of an existing device (MODIFY), or deletion of an existing device (DELETE) can be selected. Selection of the ADD button generates an ADD DEVICE CONFIGURATION screen shown in FIG. 16. Selection of the MODIFY button generates a MODIFY DEVICE CONFIGURATION screen shown in FIG. 17. Selection of the DELETE button will result in the device information for that device being deleted.

Figure 18:
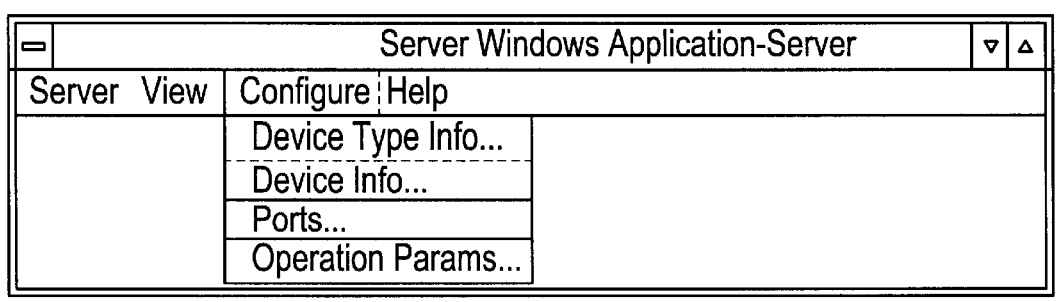
FIG. 18 is a view of the server windows application window generated by the computer software of FIG. 3.
Figure 19:
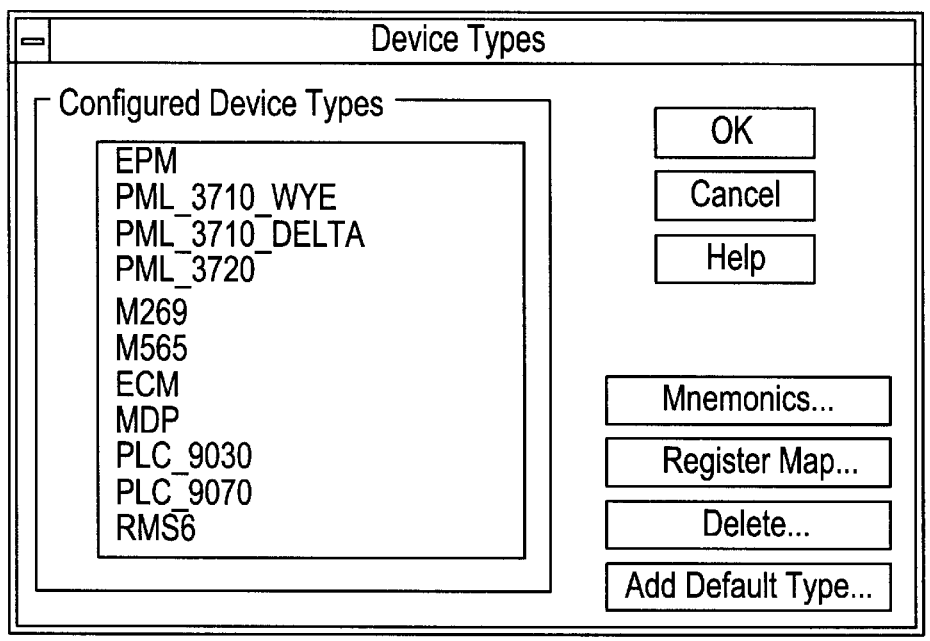
FIG. 19 is a view of a device types window generated by the computer software of FIG. 3.

From the menu generated by the CONFIGURATION button on the SERVER WINDOWS APPLICATION--SERVER screen, DEVICE TYPE INFO is selected as shown in FIG. 18. Selection of DEVICE TYPE INFO generates a DEVICE TYPES screen shown in FIG. 19. From the DEVICE TYPES screen, modify the mnemonics for a type (MNEMONICS), modify the register map for a type (REGISTER MAP), delete default type (DELETE), or add a new default type of device (ADD DEFAULT TYPE) can be selected. Selection of the MNEMONICS button generates a MNEMONICS screen, in this example for the ALPS device, shown in FIG. 20. Selection of the REGISTER MAP button generates a REGISTER MAP screen, in this example for the ALPS device, shown in FIG. 23. Selection of the DELETE button will result in that device type being deleted.

Figure 20:
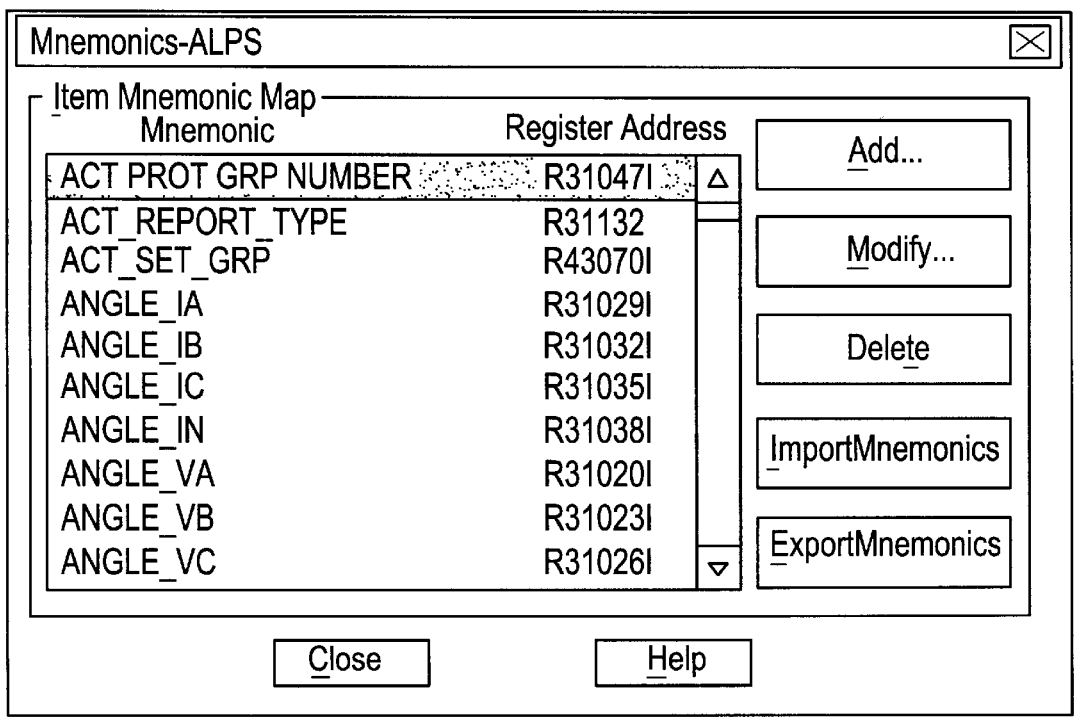
FIG. 20 is a view of a mnemonics window with import and export features generated by the computer software of FIG. 3.

From the MNEMONICS screen of FIG. 20, selection of the ADD button generates an ADD/MODIFY MNEMONICS dialog box of FIG. 21. In the ADD/MODIFY MNEMONICS dialog box of FIG. 21, a mnemonic name and its corresponding register address are entered in their respective fields. Clicking on the OK button stores the mnemonic and its corresponding register address.

From the MNEMONICS screen of FIG. 20, highlighting a mnemonic in the list (e.g., ACT_PROT_GRP_NUMBER) then selecting the MODIFY button generates an ADD/MODIFY MNEMONICS dialog box of FIG. 21 with the highlighted mnemonic and its corresponding register address in their respective fields. Selecting OK stores modifications made to the mnemonic and its corresponding register. From the MNEMONICS screen of FIG. 20, highlighting a mnemonic in the list then selecting the DELETE button deletes the highlighted mnemonic.

Also shown on the MNEMONICS screen of FIG. 20 are IMPORT MNEMONICS and EXPORT MNEMONICS buttons. These buttons allow the user to import and export computer files containing an array of mnemonics and their corresponding register addresses arranged in comma-separated value (CSV) format. Comma separated value format is a well-known file format. An example of a printout of a mnemonics file in CSV format is shown in FIG. 22, wherein each line lists a mnemonic and a definition for its corresponding register. The format used for register definition is "RyXzzzzzV" or "RyzzzzzV", where: "R" is the fixed component, "X" notifies that the following address "zzzz" is in hexadecimal format (without "X", the address "zzzzzz" is in decimal format), "y" describes the Modbus register type, and "V" describes the format that the DDE server provides the value in.

Referring again to the MNEMONICS screen of FIG. 20, the EXPORT MNEMONICS button exports the currently saved mnemonics to the mnemonics file where the data within the file can be modified by the user using, for example, Microsoft Excel, or by a configuration utility. Such modification is necessary, for example, to upgrade the mnemonics of a device class supported by the DDE server or to configure the DDE server for a new generic device type. The IMPORT MNEMONICS button is selected to import the file to the DDE server. Modification of the CSV file can be performed locally, via the host computer, or remotely, via the view node computers.

When a mnemonics file is imported, the DDE server checks the file for proper syntax before accepting the file. The DDE server also checks the mnemonic to insure that it does not exceed the allowed length (e.g. 20 characters), and compares the mnemonic to the plurality of mnemonics already stored to insure that the mnemonic is unique. In addition, the DDE server checks the correlation between the imported mnemonics and the existing register groups.

Checking this correlation includes verifying that each of the mnemonics reference a valid register group, and verifying that the Modbus register type referenced is available in the register group for that mnemonic. When an error is detected, the user is notified with information containing the name of the mnemonic and its register definition, allowing the user to correct the error.

Figure 24:
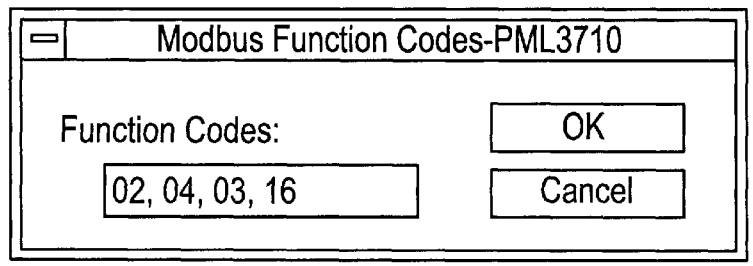
FIG. 24 is a view of a Modbus function codes window generated by the computer software of FIG. 3.
Figure 25:
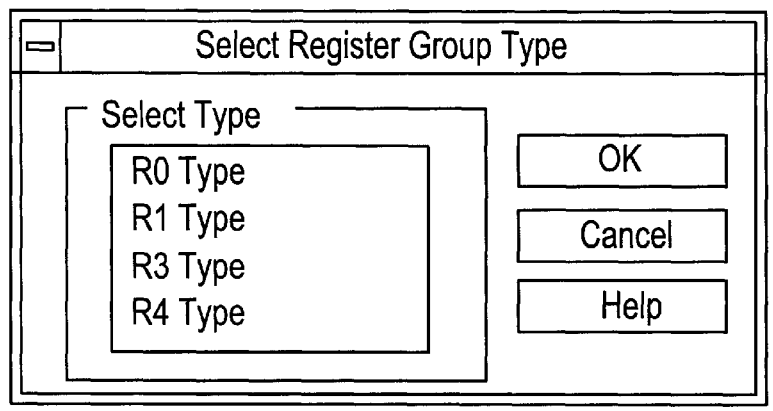
FIG. 25 is a view of a select register group type window generated by the computer software of FIG. 3.
Figure 26:
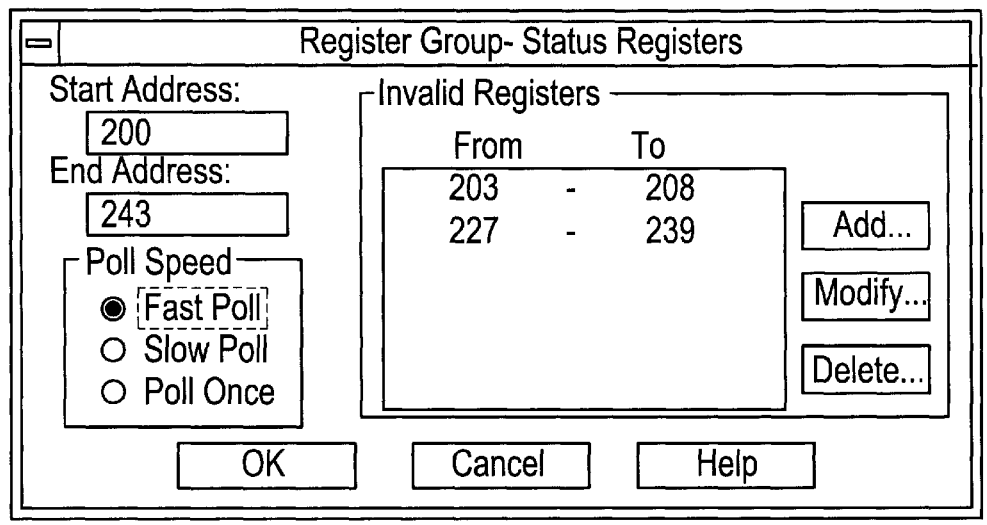
FIG. 26 is a view of a register group--status registers window generated by the computer software of FIG. 3.

From the REGISTER MAP screen of FIG. 23, addition of a new register group (ADD NEW REGISTER GROUP), delete a register group (DELETE), modification of a register group (MODIFY), import and export a register group file (IMPORT REGISTER GROUP and EXPORT REGISTER GROUP) can be selected. Selection of the ADD NEW REGISTER GROUP button when the register group being added is the first register group present in the device type generates a MODBUS FUNCTION CODES screen, in this example for the PML3710 device, shown in FIG. 24, for modification of the function codes. Thereafter, the SELECT REGISTER GROUP TYPE screen shown in FIG. 25, is generated for selection of the register group. Selection of the OK button on the SELECT REGISTER GROUP TYPE screen after the registers have been selected generates a REGISTER GROUP--STATUS REGISTERS screen shown in FIG. 26. The REGISTER GROUP--STATUS REGISTERS screen provides register group information and is displayed when the MODIFY button in the REGISTER MAP screen is selected. Selection of the ADD button on the REGISTER GROUP--STATUS REGISTERS screen generates an ADD INVALID REGISTER screen shown in FIG. 27, for adding invalid registers. Selection of the MODIFY button on the REGISTER GROUP--STATUS REGISTERS screen generates a MODIFY INVALID REGISTER screen shown in FIG. 28, for modifying invalid registers.

Referring again to the REGISTER MAP screen of FIG. 23, selecting the IMPORT REGISTER GROUP or EXPORT REGISTER GROUP buttons allow the user to import and export computer files containing an array of register group data in CSV format. An example of a printout from a register group file is shown in FIG. 29. Referring to FIG. 29, each line of data in the file contains a definition for a single register group. The first column of data describes whether the group is valid (+) or invalid (-). The second column of data contains the group name, a unique name, up to 20 characters long, of the register group. The third column defines the Modbus register type ("R" followed by types 1, 2, 3, or 4). The fourth column contains a four digit hexadecimal address of the beginning of the register group (the "0x" prefix indicates that the value to the right is hexadecimal). The fifth column contains a four digit hexadecimal address of the end of the register group. The sixth column describes the read and write access available to the registers in the group ("RO"—read only, "RW"—read/write, "WO"—write only). The seventh column describes the poll speed for the register group ("Poll Once", "Slow Poll", or "Fast Poll").

In the REGISTER MAP screen of FIG. 23, the EXPORT REGISTER GROUP button exports the currently saved register group data to the register group file where it can be modified by the user using, for example, Microsoft Excel, or by a configuration utility. Such modification is necessary, for example, to upgrade a device class supported by the DDE server or to configure the DDE server for a new generic device type. The IMPORT REGISTER GROUP button is selected to import the file to the DDE server. Modification of the CSV file can be performed locally, via the host computer, or remotely, via the view node computers.

When a file is imported, the DDE server checks the file for proper syntax before accepting the file. The DDE server also checks the file to insure that the first line in the file describes a valid register group, that there are no overlapping valid register groups for the same Modbus register type, and that there are no overlapping valid and invalid register groups. In addition, the DDE server checks the correlation between the imported register groups and the existing mnemonics. Checking this correlation involves verifying that each of the existing mnemonics reference a new, valid register group, and that the Modbus register type referenced by each existing mnemonic is available in the new register group for that mnemonic. If an error is detected, the user is notified of the invalid register groups so that they may be corrected.

Figure 30:
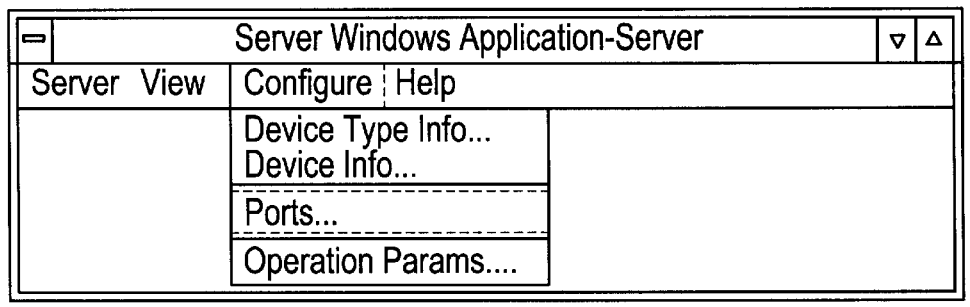
FIG. 30 is a view of the server windows application window generated by the computer software of FIG. 3.
Figure 31:
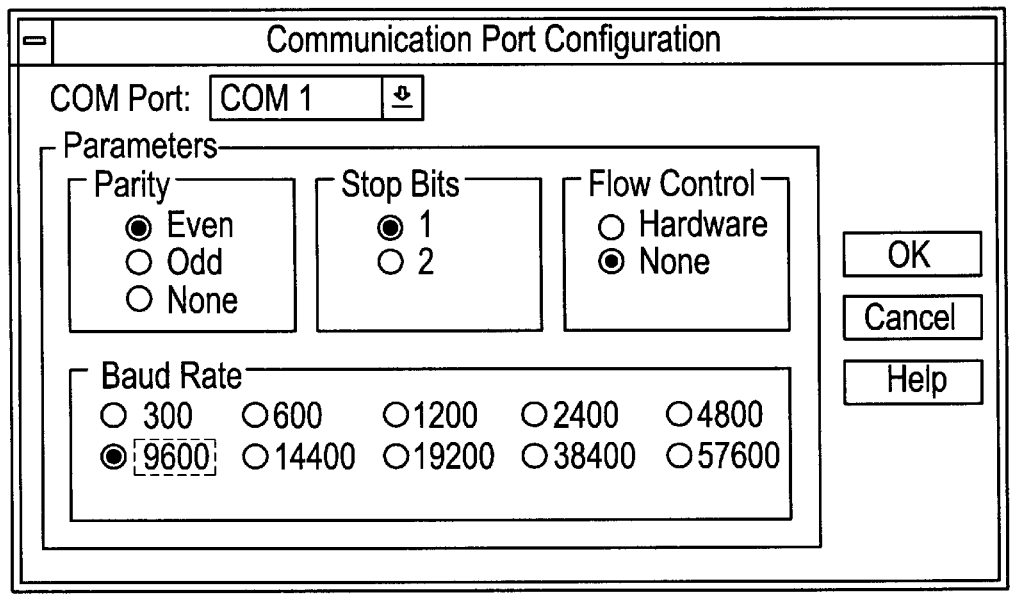
FIG. 31 is a view of a communication port configuration window generated by the computer software of FIG. 3.

From the menu generated by the CONFIGURATION button on the SERVER WINDOWS APPLICATION--SERVER screen, PORTS is selected as shown in FIG. 30. Selection of PORTS generates a COMMUNICATION PORT CONFIGURATION screen shown in FIG. 31.

From the PORTS screen parity, stop bits, flow control and baud rate are displayed and set for each communication port.

Figure 32:
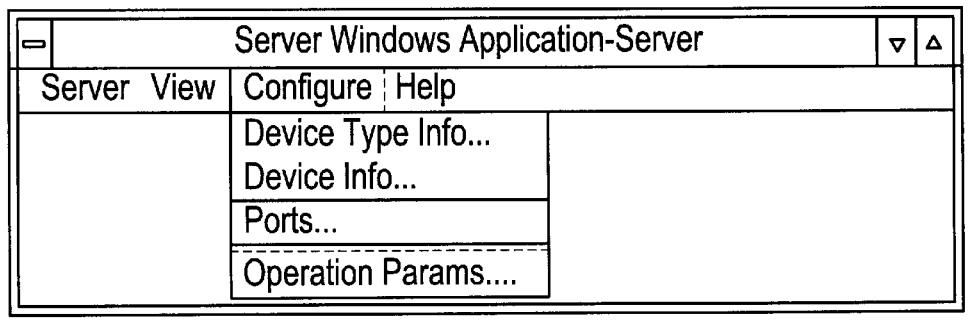
FIGS. 32–37 are views of the server windows application window generated by the computer software of FIG. 3.
Figure 33:
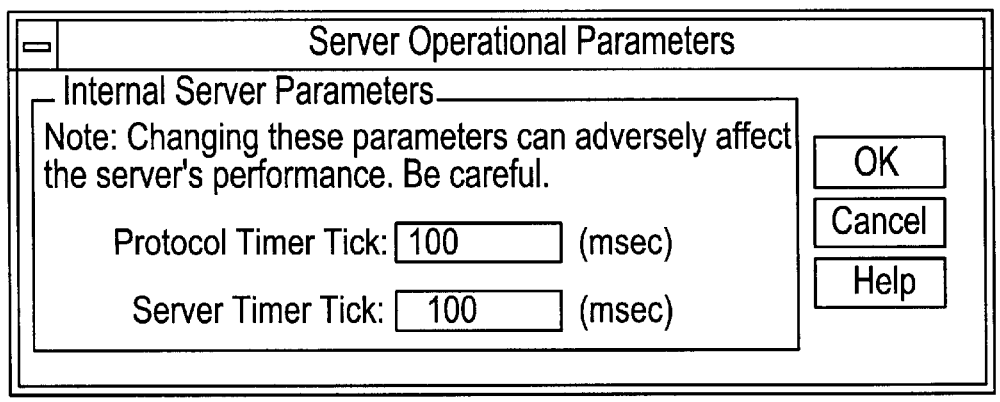

From the menu generated by the CONFIGURATION button on the SERVER WINDOWS APPLICATION--SERVER screen, OPERATION PARAMS is selected as shown in FIG. 32. Selection of OPERATION PARAMS generates a SERVER OPERATIONAL PARAMETERS screen shown in FIG. 33. From the SERVER OPERATIONAL PARAMETERS screen protocol timer tick and valid data timeout are displayed and set.

Figure 34:
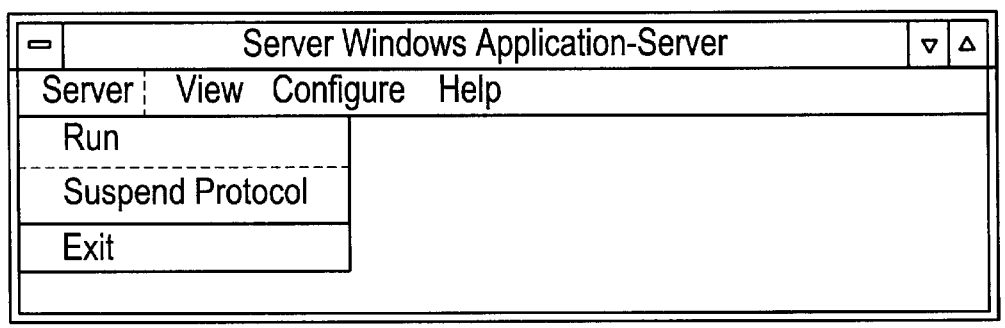
Figure 35:
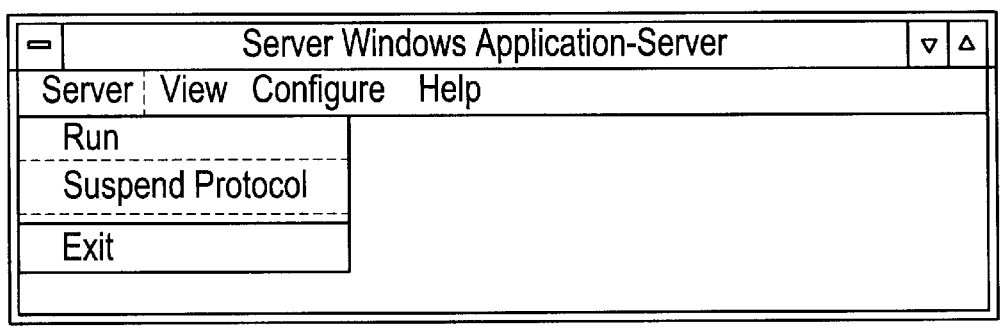
Figure 36:
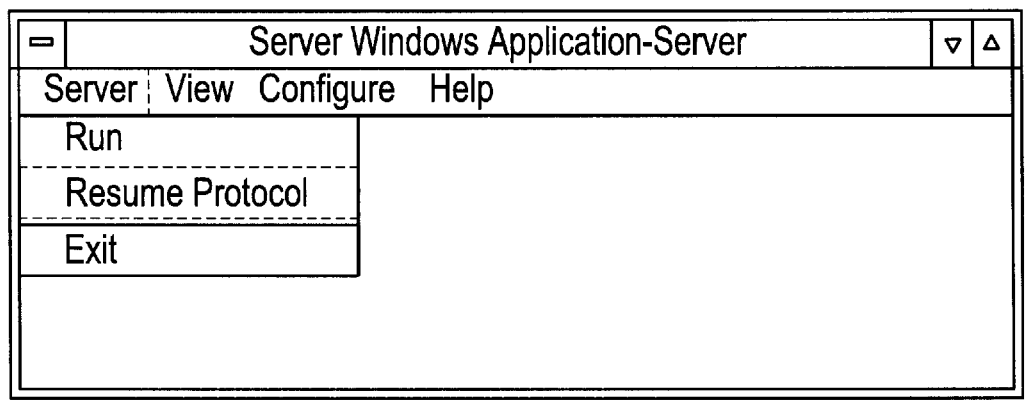

After configuration is set as defined above, the SERVER button is selected on the SERVER WINDOWS APPLICATION--SERVER screen generating a menu from which RUN is selected as shown in FIG. 34, bringing the server on-line and disabling the configuration option. From the menu generated by the SERVER button on the SERVER WINDOWS APPLICATION--SERVER screen, SUSPEND PROTOCOL is selected as shown in FIG. 35, which allows suspension of the protocol for purposes of analysis. Once protocol analysis is completed, the menu generated by the SERVER button on the SERVER WINDOWS APPLICATION--SERVER screen displays a RESUME PROTOCOL, as shown in FIG. 36, which is selected to resume protocol.

Figure 37:
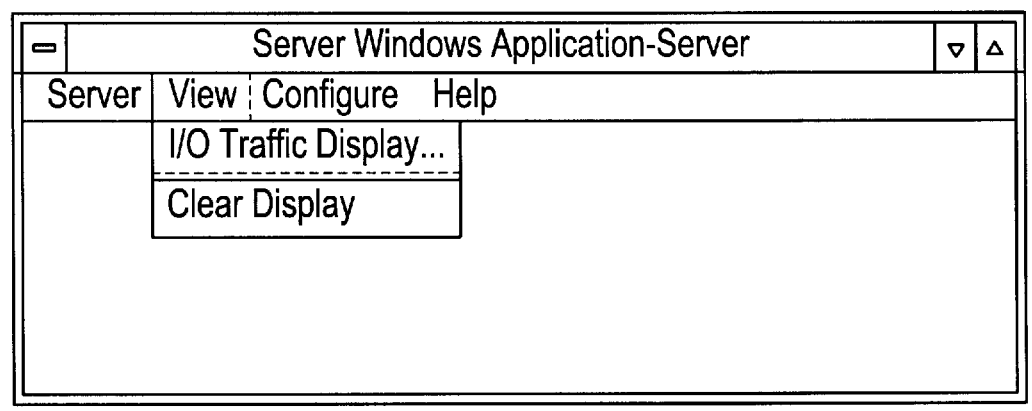
Figure 38:
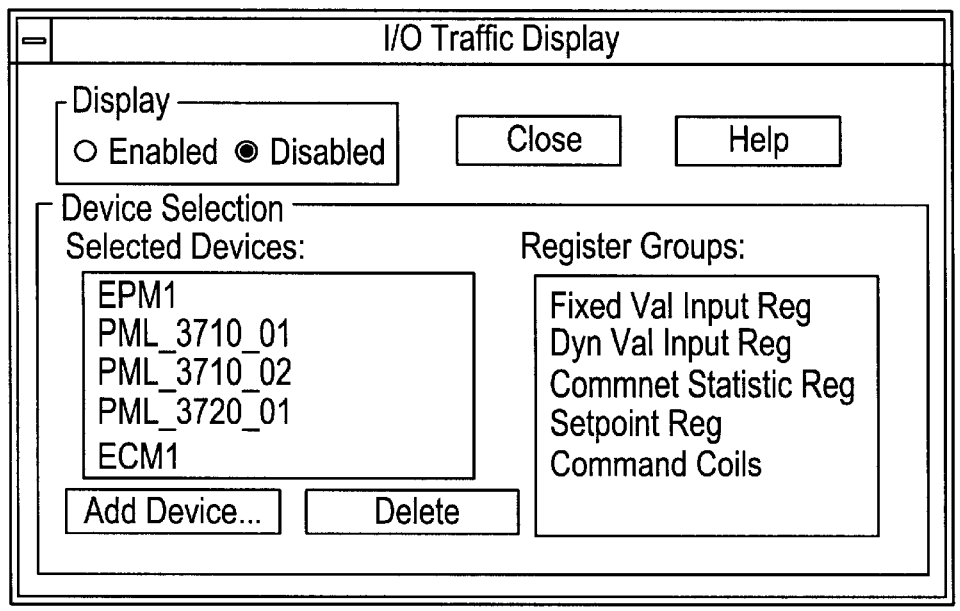
FIG. 38 is a view of an I/O traffic display window generated by the computer software of FIG. 3.
Figure 39:
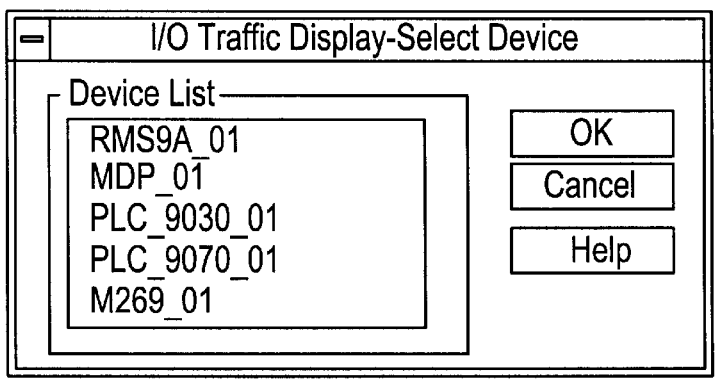
FIG. 39 is a view of an I/O traffic display—select device window generated by the computer software of FIG. 3.

Once the server is on-line, as described above, the VIEW button is selected on the SERVER WINDOWS APPLICATION--SERVER screen generating a menu from which I/O TRAFFIC DISPLAY is selected as shown in FIG. 37. Selection of I/O TRAFFIC DISPLAY generates an I/O TRAFFIC DISPLAY screen shown in FIG. 38, which provides a display of I/O traffic. Selection of the DELETE button on the I/O TRAFFIC DISPLAY screen deletes the selected device. Selection of the ADD DEVICE button on the I/O TRAFFIC DISPLAY screen generates an I/O TRAFFIC DISPLAY--SELECT DEVICE screen shown in FIG. 39, where active devices not selected for I/O traffic display are listed for selection.

Figure 40:
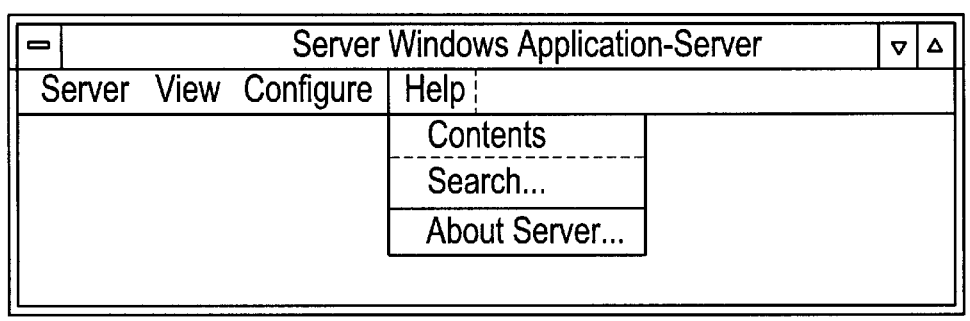
FIG. 40 is a view of the server windows application window generated by the computer software of FIG. 3

The HELP button on the SERVER WINDOWS APPLICATION--SERVER screen can be selected at any time. Selection of the HELP button generates a menu from which CONTENTS, SEARCH or ABOUT SERVER can be selected, as shown in FIG. 40. Selection of CONTENTS generates help contents screens. Selection of SEARCH generates help search topics screens. Selection of ABOUT SERVER generates information screen regarding the DDE server.

In summary, the DDE server uses the Modbus RTU protocol to communicate with a field device. The server has to poll these devices continuously and get the required data for a client. Communication parameters are set up during configuration defining what communication is to be carried out. No initialization before communicating to the devices is necessary. The server always assumes that all the devices are ready and polls them at its poll speed. All fast poll registers are polled continuously, slow poll registers are polled 'n' times slower than fast poll registers where 'n' is read from an INI file, all poll once registers are polled only once when the item becomes active. If some devices do not respond, the server declares them as DEAD and informs interested clients. More specifically, the server transmits a query packet and waits for response, i.e., the server is the master and the device is the slave. If a response from the specified device is received within a fixed time, the server checks the response for CRC error. If CRC available at the end of the response packet matches the CRC computed by server, then the response is accepted and is processed further. If CRC in above case does not match or the response has a CRC error, the server retransmits the packet. A Modbus function code is used, for certain devices that are connected through the concentrator, to request field devices to retransmit the response packet where a CRC error has occurred previously. Otherwise, a query packet is retransmitted by server. The server transmits the query packet to the device until it either gets an accepted response or a specified retransmit limit has been reached. If retransmit limit is reached, the server declares the corresponding device DEAD and stores the query packet in a slow poll queue. The same query packet will be tried again at a slower frequency. If during dead device poll, the server receives a good response packet from the device then server makes that device ACTIVE and will resume normal polling for the device.

When the server is not running (i.e., off-line mode), the user can configure the system using the configuration menu commands. The user can configure: communication port parameters, device address-topic, device register map and invalid registers, register group polling priority, device type supported function codes, and operational parameters. The user can also export and import register groups and mnemonics. By importing and exporting register groups and mnemonics, the user can quickly and dynamically change the firmware revision register map or mnemonics of a device class supported by the DDE server, change the number or types of registers or mnemonics, or add a new generic device type, all without having to implement new software. This feature saves the time and money costs normally required to write new software code. This feature, by eliminating the need to modify the software code, also eliminates the danger of introducing new software bugs.

When the server is running (i.e., on-line mode), the user can view the server's communications with field devices in I/O traffic display. This display tells the user about all the outgoing and incoming server data packets as well as all errors happening during transactions. The user may select the devices of interest for I/O traffic viewing by using the I/O traffic display dialog.

The DDE server starts up, reads configuration data from disk and initializes all other objects. The system is started in the on-line mode. The application module is used for configuration of the system. Whenever the user confirms the change (e.g., by pressing OK button, accepting the change), all configuration data is stored into hard disk.

The DDE handler passes all client requests for any topic and any item to the application module. The application module validates that the device exists and passes further request of item data to the device module. The device module is in turn dependent on register groups for getting data in the correct format for any item in any device. The register groups decide which registers are to be polled and with what Modbus function packets. Accordingly, the register groups create a suitable packet and passes it to the communication module. The communication module carries out the actual transaction with the device. The result of the transaction is returned to the register groups, which in turn passes it to the device module. After getting the data, the device module updates it to the clients.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments failings within the scope of the appended claims.

What is claimed is:

1. A method of configuring a server for a power management control system comprising:

importing a file containing register group data for a group of registers in a plurality of power monitoring or control devices, said register group data including addresses for said group of registers and a group name;

creating a register map for said group of registers using said addresses; and associating said register map with said group name.

2. The method of claim 1 wherein said register group data indicates whether said group of registers is valid.

3. The method of claim 1 wherein said register group data indicates a type of Modbus register for said group of registers.

4. The method of claim 1 wherein said register group data indicates read and writ e access to said group of registers.

5. The method of claim 1 wherein said register group data indicates a poll speed for said group of registers.

6. The method of claim 1 wherein said file is in comma separated value format.

7. The method of claim 1 further comprising:

checking said file for proper syntax.

8. The method of claim 1 further comprising:

verifying that a first valid group of registers having a Modbus register type does not overlap a second valid group of registers having said Modbus register type.

9. The method of claim 1 further comprising:

checking a correlation between said group of registers and a mnemonic mapped to a register within said group of registers, said register group data indicating whether said group of registers is valid, and said checking including verifying that said group of registers is valid.

10. The method of claim 1 further comprising:

checking a correlation between said group of registers and a mnemonic mapped to a register within said group of registers, said mnemonic indicating a first Modbus register type, said register group data indicating a second Modbus register type, and said checking including verifying that said first Modbus register type is the same as said second Modbus register type.

11. The method of claim 1 further comprising:

verifying that a valid group of registers does not overlap an invalid group of registers.

12. A method of configuring a server for a power management control system comprising:

importing a file including a mnemonic and an address for a register in a power monitoring or control device;

creating a register map f or said register using said address; and associating said register map with said mnemonic.

13. The method of claim 12 wherein said file further includes a first Modbus register type.

14. The method of claim 12 wherein said file is in comma separated value format.

15. The method of claim 12 further comprising:

checking said file for proper syntax.

16. The method of claim 12 further comprising:

comparing said mnemonic with a plurality of mnemonics; and verifying that said mnemonic does not exist in said plurality of mnemonics.

17. The method of claim 13 further comprising:

checking a correlation between said mnemonic and a group of registers including said register, said group of registers having a second Modbus register type, and said checking including verifying that said first Modbus register type is the same as said second Modbus register type.

18. The method of claim 12 further comprising:

verifying that said register is in a valid register group.

19. A method of configuring a server for a power management control system comprising:

exporting a file containing register group data for a group of registers in a plurality of power monitoring or control devices;

modifying said register group data to create modified register group data;

saving said modified register group data in said file;

importing said file containing said modified register group data; and creating a register map for said group of registers using said modified register group data.

20. A method of configuring a server for a power management control system comprising:

exporting a file containing data, said data including a mnemonic and an address for a register in a power monitoring or control device;

modifying said data to create modified data;

saving said modified data in said file;

importing said file containing said modified data; and creating a register map for said register using said modified data.

* * * * *